(12) United States Patent
Sava et al.

(10) Patent No.: US 9,702,997 B2
(45) Date of Patent: Jul. 11, 2017

(54) WAVE-EQUATION MIGRATION VELOCITY ANALYSIS USING IMAGE WARPING

(75) Inventors: Paul Sava, Littleton, CO (US); Francesco Perrone, Golden, CO (US); Clara Andreoletti, San Donato Milanese (IT); Nicola Bienati, Origgio (IT)

(73) Assignee: Colorado School of Mines, Golden, CO (US)

( * ) Notice: Subject to any disclaimer, the term of this patent is extended or adjusted under 35 U.S.C. 154(b) by 176 days.

(21) Appl. No.: 14/131,962

(22) PCT Filed: Jul. 12, 2012

(86) PCT No.: PCT/US2012/046380
§ 371 (c)(1),
(2), (4) Date: May 20, 2014

(87) PCT Pub. No.: WO2013/009944
PCT Pub. Date: Jan. 17, 2013

(65) Prior Publication Data
US 2014/0321713 A1    Oct. 30, 2014

Related U.S. Application Data

(60) Provisional application No. 61/506,968, filed on Jul. 12, 2011.

(51) Int. Cl.
*G01V 1/30* (2006.01)
*G06T 7/20* (2017.01)

(52) U.S. Cl.
CPC ............. *G01V 1/303* (2013.01); *G06T 7/20* (2013.01); *G01V 2210/51* (2013.01); *G01V 2210/67* (2013.01)

(58) Field of Classification Search
None
See application file for complete search history.

(56) References Cited

U.S. PATENT DOCUMENTS

| 5,886,255 A * | 3/1999 | Aronstam | ............... E21B 47/00 166/254.1 |
| 5,987,387 A * | 11/1999 | Dickens | .................. G06F 17/10 702/14 |

(Continued)

OTHER PUBLICATIONS

T. van Leeuwen and W.A. Mulder, "Velocity analysis based on data correlation," Geophysical Prospecting, 2008, 56, 791-803.*

(Continued)

*Primary Examiner* — Matthew Bella
*Assistant Examiner* — Soo Shin
(74) *Attorney, Agent, or Firm* — Sheridan Ross P.C.

(57) ABSTRACT

An objective function is disclosed that extracts the velocity error information directly in the image domain without computing common-image gathers. Because of the dimensionality of the problem, gradient-based methods (such as the conjugate-gradient algorithm) are used in the optimization procedure. In order to include the full complexity of the wavefield in the velocity estimation algorithm, a two-way (as opposed to one-way) wave operator is considered, where the imaging operator is not linearized with respect to the model parameters (as in linearized wave-equation migration velocity analysis), and the gradient of the objective function is determined using the adjoint-state method. The velocity estimation methodology is illustrated with a few synthetic examples.

20 Claims, 22 Drawing Sheets

(56) References Cited

U.S. PATENT DOCUMENTS

| | | | | |
|---|---|---|---|---|
| 5,991,237 | A * | 11/1999 | de Bazelaire | G01V 1/303 367/50 |
| 6,005,916 | A * | 12/1999 | Johnson | A61B 5/05 378/87 |
| 6,052,333 | A * | 4/2000 | Williams | G01V 1/20 367/37 |
| 6,574,563 | B1 * | 6/2003 | Nickel | G01V 1/28 702/14 |
| 7,082,368 | B2 * | 7/2006 | Nickel | G01V 1/286 702/17 |
| 7,577,061 | B2 * | 8/2009 | Williamson | G01V 1/30 367/38 |
| 8,406,081 | B2 * | 3/2013 | Xia | G01V 1/303 367/73 |
| 8,537,637 | B2 * | 9/2013 | Laake | G01V 1/003 181/111 |
| 8,537,638 | B2 * | 9/2013 | Lee | G01V 1/368 367/73 |
| 2005/0143921 | A1 * | 6/2005 | Winbow | G01V 99/00 702/14 |
| 2009/0006000 | A1 | 1/2009 | Shin | |
| 2009/0010104 | A1 * | 1/2009 | Leaney | G01V 1/364 367/47 |
| 2011/0046907 | A1 | 2/2011 | Gilmore et al. | |
| 2011/0096627 | A1 * | 4/2011 | Hill | G01V 1/282 367/73 |
| 2012/0075954 | A1 * | 3/2012 | Xu | G01V 1/303 367/38 |
| 2012/0095690 | A1 * | 4/2012 | Higginbotham | G01V 1/28 702/18 |
| 2013/0144534 | A1 * | 6/2013 | Hilterman | G01V 1/284 702/18 |
| 2013/0289879 | A1 * | 10/2013 | Grandi | G01V 1/30 702/6 |
| 2015/0185345 | A1 * | 7/2015 | Albertin | G01V 1/362 702/14 |
| 2015/0276956 | A1 * | 10/2015 | Khalil | G01V 1/28 702/16 |

OTHER PUBLICATIONS

International Search Report and Written Opinion for International (PCT) Patent Application No. PCT/US12/46380 mailed Oct. 2, 2012, 8 pages.
International Preliminary Report on Patentability for International (PCT) Patent Application No. PCT/US12/46380 mailed Jan. 23, 2014, 6 pages.
Albertin et al., "Adjoint wave-equation velocity analysis," Society of Exploration Geophysicists International Exposition and 76th Annual Meeting, 2006, vol. 6, pp. 3345-3349.
Al-Yahya, "Velocity analysis by iterative profile migration," Geophysics, 1989, vol. 54, Iss. 6, pp. 718-729.
Baysal et al., "Reverse time migration," Geophysics, 1983, vol. 48, Iss. 11, pp. 1514-1524.
Biondi et al., "Angle-domain common-image gathers for migration velocity analysis by wavefield continuation imaging," Geophysics, 2004, vol. 69, Iss. 5, pp. 1283-1298.
Biondi et al., "Wave-equation migration velocity analysis," Presented at the Society of Exploration Geophysicists International Exposition and 69th Annual Meeting, 1999, 4 pages.
Bishop et al., "Tomographic determination of velocity and depth in laterally varying media," Geophysics, 1985, vol. 50, Iss. 6, pp. 903-923.
Chang et al., "Wavefront sets of solutions to linearised inverse scattering problems," Inverse Problems, 1987, vol. 3, No. 4, pp. 683-690.
Chavent et al., "Determination of background velocities by multiple migration fitting," Geophysics, 1995, vol. 60, Iss. 2, pp. 476-490.
Claerbout et al., "Robust modeling with erratic data," Geophysics, 1973, vol. 38, Iss. 5, pp. 826-844.
De Vries et al., "Velocity analysis based on minimum entropy," Geophysics, 1984, vol. 49, Iss. 12, pp. 2132-2142.
Farmer et al., "Application of reverse time migration to complex imaging problems," First Break, 2006, vol. 24, Iss. 9, pp. 65-73.
Faye et al., "Prestack Migration Velocities from Focusing Depth Analysis," Society of Exploration Geophysicists Technical Program Expanded Abstracts, 1986, pp. 438-440.
Fomel, "Applications of plane-wave destruction filters," Geophysics, 2002, vol. 67, Iss. 6, pp. 1946-1960.
Fowler, "Migration velocity analysis by optimization: linear theory," Stanford Exploration Project, 1985, 20 pages.
Gazdag et al., "Migration of seismic data by phase shift plus interpolation," Geophysics, 1984, vol. 49, Iss. 2, pp. 124-131.
Hale, "A method for estimating apparent displacement vectors from time-lapse seismic images," Technical Report CWP-566, Center for Wave Phenomena, Colorado School of Mines, 2007, pp. 79-90.
Hale, "An efficient method for computing local cross-correlations of multi-dimensional signals," Technical Report CWP-544, Center for Wave Phenomena, Colorado School of Mines. 2006, pp. 253-259.
Hale, "Local dip filtering with directional Laplacians," Technical Report CWP-567, Center for Wave Phenomena, Colorado School of Mines. 2007, pp. 91-102.
Kelly et al., "A comparison of inversion results for two full-waveform methods that utilize the lowest frequencies in dual-sensor recordings," Society of Exploration Geophysicists International Exposition and 80th Annual Meeting, 2010, p. 940-944.
Lambaré et al., "Stereotomography: a semi-automatic approach for velocity macromodel estimation," Geophysical Prospecting, 2004, vol. 52, Iss. 6, pp. 671-681.
Liu et al., "Toward a unified analysis for source plane wave migration," Geophysics, 2006, vol. 71, Iss. 4, pp. S129-S139.
Ma et al., "Full waveform inversion with image-guided gradient," Society of Exploration Geophysicists International Exposition and 80th Annual Meeting, 2010, p. 1003-1007.
McMechan, "Migration by extrapolation of time dependent boundary values," Geophysical Prospecting, 1983, vol. 31, Iss. 3, pp. 413-420.
Morton et al., "Faster shot-record migration using phase encoding," Presented at the Society of Exploration Geophysicists International Exposition and 68th Annual Meeting, 1998.
Mulder et al., "Automatic velocity analysis by differential semblance optimization," Geophysics, 2002, vol. 67, Iss. 4, pp. 1184-1191.
Perrone et al., "Linearized wave-equation migration velocity analysis by image warping" Technical Report CWP-708, Center for Wave Phenomena, Colorado School of Mines, 2012, 18 pages.
Perrone et al., "Wave-equation migration with dithered plane waves," Geophysical Prospecting, 2011, vol. 60, Iss. 3, pp. 444-465.
Perrone et al., "Wavefield tomography based on local image correlation," 2011, 5 pages.
Perrone et al., "Wavefield tomography based on local image correlations," Technical Report CWP-709, Center for Wave Phenomena, Colorado School of Mines. 2012, pp. 51-76.
Perrone et al., "Wavefield-based velocity analysis by image warping," 2010, 39 pages.
Plessix, "A review of the adjoint-state method for computing the gradient of a functional with geophysical applications," Geophysical Journal International, 2006, vol. 167, Iss. 2, pp. 495-503.
Pratt, "Seismic waveform inversion in the frequency domain, Part 1: Theory and verification in a physical scale model," Geophysics, 1999, vol. 64, Iss. 3, pp. 888-901.
Rickett et al., "Offset and angle-domain common image-point gathers for shot-profile migration," Geophysics, 2002, vol. 67, Iss. 3, pp. 883-889.
Romero et al., "Phase encoding of shot records in prestack migration," Geophysics, 2000, vol. 65, Iss. 2, pp. 426-436.
Sava et al., "Angle-domain common-image gathers by wavefield continuation methods," Geophysics, 2003, vol. 68, Iss. 3, pp. 1065-1074.
Sava et al., "Extended common image-point gathers for wave-equation migration," Presented at the 71st European Association of Geoscientists and Engineers Conference and Exhibition, 2009, 4 pages.

(56) References Cited

OTHER PUBLICATIONS

Sava et al., "Wave-equation migration velocity analysis by focusing diffractions and reflections," Geophysics, 2005, vol. 70, Iss. 3, pp. U19-U27.

Sava et al., "Wave-equation migration velocity analysis. I. Theory," Geophysical Prospecting, 2004, vol. 52, Iss. 6, pp. 593-606.

Shen et al., "Automatic velocity analysis via shot profile migration" Geophysics, 2008, vol. 73, Iss. 5, pp. VE49-VE59.

Sirgue et al., "Efficient waveform inversion and imaging: A strategy for selecting temporal frequencies," Geophysics, 2004, vol. 69, Iss. 1, pp. 231-248.

Sirgue et al., "Full waveform inversion: the next leap forward in imaging at Valhall," First Break, 2010, vol. 28, Iss. 4, pp. 65-70.

Soubaras, "Modulated-shot migration," Society of Exploration Geophysicists International Exposition and 76th Annual Meeting, 2006, pp. 2430-2433.

Stoffa et al., "Plane-wave depth migration," Geophysics, 2006, vol. 71, Iss. 6, pp. S261-S272.

Stoffa et al., "Split-step Fourier migration," Geophysics, 1990, vol. 55, Iss. 4, pp. 410-421.

Stolt, "Migration by fourier transform," Geophysics, 1978, vol. 43, Iss. 1, pp. 23-48.

Symes et al., "Velocity inversion by differential semblance optimization," Geophysics, 1991, vol. 56, Iss. 5, pp. 654-663.

Symes, "Layered velocity inversion: A model problem from reflection seismology," Society for Industrial and Applied Mathematics Journal on Mathematical Analysis (SIMA), 1991, vol. 22, Iss. 3, pp. 680-716.

Symes, "Migration velocity analysis and waveform inversion," Geophysical Prospecting, 2008, vol. 56, Iss. 6, pp. 765-790.

Taner et al., "Velocity spectra—digital computer derivation and applications of velocity functions," Geophysics, 1969, vol. 34, Iss. 6, pp. 859-881.

Tarantola, "Inversion of seismic reflection data in the acoustic approximation," Geophysics, 1984, vol. 49, Iss. 8, pp. 1259-1266.

Van Leeuwen et al., "Velocity analysis based on data correlation," Geophysical Prospecting, 2008, vol. 56, Iss. 6, 791-803.

Van Vliet et al., "Estimators for orientation and anisotropy in digitized images," Proceedings of the first conference of the Advanced School for Computing and Imaging, ASCI'95, 1995, pp. 442-450.

Woodward, "Wave-equation tomography," Geophysics, 1992, vol. 57, Iss. 1, pp. 15-26.

Xie et al., "The finite-frequency sensitivity kernel for migration residual moveout and its applications in migration velocity analysis," Geophysics, 2008, vol. 73, Iss. 6, pp. S241-S249.

Yang et al., "Wave-equation migration velocity analysis with extended common-image-point gathers," Society of Exploration Geophysicists International Exposition and 80th Annual Meeting, 2010, pp. 4369-4374.

Yang, "Wave-equation migration velocity analysis with time-shift imaging," Geophysical Prospecting, 2011, vol. 59, Iss. 4, pp. 635-650.

Yilmaz et al., "Migration velocity analysis by wave-field extrapolation," Geophysics, 1984, vol. 49, Iss. 10, pp. 1664-1674.

Zhang et al., "Delayed-shot 3D depth migration" Geophysics, 2005, vol. 70, Iss. 5, pp. E21-E28.

\* cited by examiner

WAVE-EQUATION MIGRATION VELOCITY ANALYSIS USING IMAGE WARPING

CROSS REFERENCE TO RELATED APPLICATION

This application is a national stage application under 35 U.S.C. 371 of PCT Application No. PCT/US2012/046380, having an international filing date of Jul. 12, 2012, which designated the United States, and which claimed priority to U.S. Application No. 61/506,968, filed on Jul. 12, 2011, both of which are hereby incorporated by reference in their entirety.

RELATED APPLICATION DATA

This application claims the benefit of and priority under 35 U.S.C. §119(e) to U.S. Patent Application No. 61/506,968, filed Jul. 12, 2011, entitled "WAVE-EQUATION MIGRATION VELOCITY ANALYSIS USING IMAGE WARPING," which is incorporated herein by reference its entirety. Additionally, the reports entitled "WAVEFIELD-BASED VELOCITY ANALYSIS BY IMAGE WARPING" (attached to the above referenced Provisional application as Exhibit "A") and "WAVEFIELD TOMOGRAPHY BASED ON LOCAL IMAGE CORRELATION" (attached to the above referenced Provisional application as Exhibit "B") are incorporated herein by reference in their entirety.

FIELD

An exemplary aspect is related to seismic imaging by wavefield extrapolation.

In some embodiments, a model of the Earth is estimated based on reflection seismic data. The general idea described herein is that if a correct model is obtained, then the reflected energy is correctly relocated in the subsurface at the places where discontinuities of material properties occur (i.e. where the reflectors exist in the subsurface).

A common idea used for this is the semblance principle. This principle says that if the Earth model is correct, then different experiments image reflectors in the same place. Otherwise, they do not.

Typically, comparison between images is done in common-image-gathers.

These are collections of images constructed for many experiments at the same positions in the subsurface. For example, 100 images can be lined-up as a function of depth (z) at the same horizontal positions (x,y). Those 100 experiments are expected to place the reflectors at the same depth, therefore the "gathers" are "flat" (all experiments see the same Earth).

This process ignores the fact that when the velocity is incorrect the imaged reflectors move not only up and down, but also sideways. This movement cannot be seen because the analysis is done at a fixed horizontal position (x,y). This process also requires that the constructions of images of a large number of experiments in order to analyze how the images change with experiment (i.e. evaluate the "gather moveout").

The exemplary process proposed herein is similar with the process described above in that images are created for different experiments and it can be expected to see the images of reflectors at the same positions in the subsurface. In contrast to the standard position, gathers are not constructed, but pairs (small groups) of images are compared at all positions. Thus, the semblance principle can be exploited, but without gathers. In this way, the procedure becomes both cheaper (it is not necessary to have all experiments before an evaluation of model accuracy is performed), and also more robust (all the image at all positions can be used, as opposed to gathers constructed at some positions). A model can be gradually built while images are accumulated for different experiments; whereas with gathers, all the images are needed before the model is evaluated for inaccuracy.

The exemplary model update procedure described herein employs the definition of an objective function which minimizes when the model is correct. A numeric procedure is used to minimize this function and in the process update the model.

For the comparison of images constructed for different (neighboring) experiments, there are different possibilities. One can simply correlate the images at every point in space. If the velocity is correct, then the image correlation is maximum somewhere along the analyzed reflector. Otherwise, the maximum cross-correlation occurs away from the analyzed reflector. One can define the objective function directly on this cross-correlation function.

Alternatively, one can evaluate a vector field (the warp field) which points in the direction of the maximum cross-correlation. One can also measure on the image a dip field, which is simply orthogonal to the reflectors. If the maximum cross-correlation occurs along the reflector, then the warp field is parallel with the reflector.

Therefore, the dip and warp field are orthogonal. One can also define an objective function on these two fields: if the vectors are orthogonal (i.e. the velocity is correct), then their dot product is zero, thus the objective function is minimum. Alternatively, if the vector fields are not orthogonal (i.e. the velocity is incorrect), then their dot product is not zero, thus the objective function is not minimum. The model can then be updated in the direction that minimizes the objective function.

This is the essence of the method. The really original portion is the objective function defined on nearby images, either directly through cross-correlation or through the vector fields defined on the cross-correlation. One could also use other measures of image similarity, like deconvolution of the images, instead of their cross-correlation.

Further details related to the proposed method are discussed in detail in the attachments referenced above.

BACKGROUND

Seismic imaging involves the estimation of wave propagation velocities in the subsurface from seismic data recorded at the surface. Seismic velocities are related to other physical parameters (for example, density and compressibility, which characterize the lithology of the Earth), and rock-mechanics parameters (for example, porosity and fluid overpressure, which are crucial in reservoir engineering) (Carcione, 2007).

Seismic imaging includes the estimation of both the position of the structures that generate the data recorded at the surface and of a model that describes wave propagation in the subsurface. The two problems are closely related since a model is necessary to infer the position of the reflectors. Waves recorded at the surface are extrapolated in a model of the subsurface (by solving a wave equation) and cross-correlated with a synthetic source wavefield simulated in the same model (Claerbout, 1985). Under the single scattering approximation, reflectors are located where the source and receiver wavefields match in time and space.

Wave-equation tomography (Tarantola, 1984; Woodward, 1992; Biondi and Sava, 1999) is a family of techniques that estimate the velocity model parameters from finite bandwidth signals recorded at the surface. The inversion is usually formulated as an optimization problem where the correct velocity model minimizes an objective function that measures the inconsistency between a trial model and the observations. The objective function can be defined either in the data-space (full-waveform inversion) or in the image-space (migration velocity analysis).

Full-waveform inversion (FWI) (Tarantola, 1984; Pratt, 1999; Sirgue and Pratt, 2004) addresses the estimation problem in the data-space and measures the mismatch between the observations and simulated data. Full-waveform inversion aims to reconstruct the exact model that generates the recorded data. By matching both traveltimes and amplitudes, full-waveform inversion allows one to achieve high-resolution (Sirgue et al., 2010). Nonetheless, a source estimate is needed, the physics of wave propagation (for example, isotropic vs. anisotropic, acoustic vs. elastic, etc.) must be correctly modeled, and a good parameterization (for example, impedance vs. velocity contrasts) is crucial (Kelly et al., 2010). Moreover, an accurate initial model is key to avoid cycle skipping and converge to the global minimum (instead of a local minimum) of the objective function.

Because of the nonlinearity of the wavefields with respect to the velocity model, the objective function in the data domain is highly multimodal (Santosa and Symes, 1989), and local optimization methods can easily get trapped into local minima and fail to converge to the correct model. This is particularly true for reflection full-waveform inversion. Refraction full-waveform inversion focuses on diving waves and mutes the data, retaining only the diving energy (Pratt, 1999). This leads to a better-behaved objective function but requires very long offsets in order to record the refracted energy. Moreover, this approach limits the depth at which a robust inversion result can be expected.

Migration velocity analysis (MVA) (Fowler, 1985; Faye and Jeannot, 1986; Al-Yahya, 1989; Chavent and Jacewitz, 1995; Biondi and Sava, 1999; Sava et al., 2005; Albertin et al., 2006) defines the objective function in the image space and is based on the semblance principle (Al-Yahya, 1989). If the velocity model is correct, images from different experiments must be consistent with each other because a single Earth model generates the recorded data. A measure of consistency is usually computed through conventional semblance (Taner and Koehler, 1969) or differential semblance (Symes and Carazzone, 1991). These two functionals analyze a set of migrated images at fixed locations in space; they consider all the shots that illuminate the points under investigation. Migration velocity analysis leads to smooth objective functions and well-behaved optimization problems (Symes, 1991; Symes and Carazzone, 1991) and is less sensitive than full-waveform inversion to the initial model. On the other hand, because an exemplary embodiment does not use amplitudes in the imaging step, the estimated model has lower resolution than the ideal full-waveform inversion result (Uwe Albertin, personal communication).

Migration velocity analysis measures either the invariance of the migrated images in an auxiliary dimension (reflection angle, shot, etc.) (Al-Yahya, 1989; Rickett and Sava, 2002; Sava and Fomel, 2003; Xie and Yang, 2008) or focusing in an extended space (Rickett and Sava, 2002; Symes, 2008; Sava and Vasconcelos, 2009; Yang and Sava, 2011). All these approaches require the migration of the entire survey in order to analyze the moveout curve in common-image gathers or measure focusing at a specific spatial location. The dimensionality of the (extended) image space and computational complexity of the velocity analysis step rapidly explodes for realistic case scenarios. Moreover, because of the high memory requirement for storing the partial information from each experiment, only a subset of the image points can be considered in the evaluation of the objective function. Illumination holes and/or irregular acquisition geometries can also impact the quality of the common-image gathers but no systematic study of this problem is reported in the literature to our knowledge.

Reverse-time migration (Baysal et al., 1983; McMechan, 1983) is routinely used in exploration geophysics because of its ability to correctly handle the full complexity of the wave propagation phenomena (under the assumption that the physics of wave propagation in the subsurface is correctly modeled). Its computational cost is nevertheless still prohibitive and limits its integration into a migration velocity analysis loop that requires the extraction of common-image gathers for moveout analysis. A migration velocity analysis procedure based on a full-wave propagation engine allows exploitation of more complex wave phenomena (e.g. overturning reflection, prismatic waves, and multiples) and increases the amount of information in the data that can be used (Farmer et al., 2006). Nonetheless, because of the intrinsic cost of wave extrapolation in the time domain, a different approach must be considered for an effective and efficient implementation of velocity model building.

Up to now, the powerful tool offered by reverse-time migration has been used only for reconstructing an image of the impedance contrasts in the subsurface. The velocity model used for generating a migrated image is obtained with other techniques, for example through traveltime tomography (Bishop et al., 1985) or through wave-equation migration velocity analysis (Biondi and Sava, 1999; Sava and Biondi, 2004; Shen and Symes, 2008), which are based on asymptotic approximations and/or linearization of the wave equation operator. These techniques do not exploit all the information encoded in the recorded wavefields because they are either inaccurate in complex velocity models (traveltime tomography) or unable to properly model part of the propagation phenomena (one-way methods). Designing a velocity model-building procedure based on a two-way wave propagation engine will allow an exemplary embodiment to exploit the full complexity of the wavefields and will make the velocity analysis step conceptually consistent with the imaging algorithm used.

Because reverse-time migration is so demanding from a computational and storage point of view, an exemplary embodiment proposes to analyze the semblance of small groups of migrated images from nearby experiments, i.e. neighboring shots or plane-waves with similar ray-parameter or take-off angle, at every image point illuminated by the experiments. Reverse-time migration works only in common-shot and common-receiver configurations, so the choice of the shot-domain for performing migration velocity analysis with a two-way engine may be preferable. Here, we use the word "shot" in its broader sense to include synthetic shot-gathers like plane-wave sources (Whitmore, 1995; Liu et al., 2006; Stoffa et al., 2006; Zhang et al., 2005), random shot-encoded sources (Morton and Ober, 1998; Romero et al., 2000) or any other phase-/amplitude-encoded source (Soubaras, 2006; Perrone and Sava, 2011) in the range of shot-profile migration. Other techniques for velocity model building in the shot-domain use different strategies. Nonetheless, all of them consider the entire survey and migrate all the data before starting the migration velocity analysis loop (deVries and Berkhout, 1984; Yilmaz and Chambers, 1984; Al-Yahya, 1989; Chavent and Jacewitz, 1995; Sava and Biondi, 2004; Shen and Symes, 2008; Symes, 2008; Xie and Yang, 2008). One exemplary embodiment discloses an objective function that evaluates the degree of semblance between images through local correlations in the image space and does not need common-image gathers (CIGs). A morphologic relationship between images is used from nearby experiments to define an objective function that measures shifts in the image space.

The methodology described in this work follows from the linearized wave-equation MVA operator proposed by (Perrone et al., 2012) but removes the linearization of the wave-operator with respect to the model parameters and thus accounts for the full two-way nature of the wavefields. An exemplary embodiment computes the gradient of the objective function with the adjoint-state method (Plessix, 2006). One exemplary advantage of the technique disclosed herein is that it reduces the memory requirements and avoids the need to pick moveout on gathers, and allows the inclusion of all points illuminated by the seismic experiments in the velocity model building.

SUMMARY

The estimation of a velocity model from seismic data is a crucial step for obtaining a high-quality image of the subsurface. Velocity estimation is usually formulated as an optimization problem where an objective function measures the mismatch between synthetic and recorded wavefields and its gradient is used to update the model. The objective function can be defined in the data-space (as in full-waveform inversion) or in the image-space (as in migration velocity analysis). In general, the latter leads to smooth objective functions, which are monomodal in a wider basin about the global minimum compared to the objective functions defined in the data space. Nonetheless, migration velocity analysis requires construction of common-image gathers at fixed spatial locations and subsampling of the image in order to assess the consistency between the trial velocity model and the observed data.

In accordance with an exemplary embodiment, an objective function is described that extracts the velocity error information directly in the image domain without computing common-image gathers. Because of the dimensionality of the problem, gradient-based methods (such as the conjugate-gradient algorithm) are used in the optimization procedure. In order to include the full complexity of the wavefield in the velocity estimation algorithm, the technique considers a two-way (as opposed to one-way) wave operator, and the imaging operator is not linearized with respect to the model parameters (as in linearized wave-equation migration velocity analysis), and computes the gradient of the objective function using the adjoint-state method. The velocity estimation methodology is then illustrated with a few synthetic examples.

In order to set up an optimization problem, a residual is defined in either the data space, $r(t)$, or the image space, $r(x)$, that represents an indirect measure of the error in the model parameters. An objective function can then be defined as the energy ($l_2$ norm) of the residual in the appropriate domain. Other norms (for example the $l_1$ norm) have been used to exploit the concept of scarcity and gain robustness against the unavoidable noise in the data (Claerbout and Muir, 1973; Tarantola, 2005).

In the simple case of linear problems, the $l_2$ norm leads to quadratic optimization problems for which the gradient of the objective function can easily be computed; in contrast, the $l_1$ norm leads to nonquadratic objective functions which are much more difficult to differentiate. This fundamental difference makes the $l_2$ norm a more popular choice for setting up an inverse problem in the optimization framework. In the following, a briefly review how the residual is defined is presented; then, an exemplary measure of velocity error in the image space and the resulting objective function is demonstrated. The adjoint-state calculation of the gradient concludes the section.

Data Space Residuals

The residual $r(t)$ can be defined in different ways: in full-waveform inversion, the residual is a function of time, and it is defined as the difference between the synthetic and observed data (Tarantola, 1984):

$$r(t) = d^{syn}(t) - d^{obs}(t).$$

This residual captures information about the traveltime and amplitude error due to an incorrect velocity model. The observed data set a time reference and the mismatch in traveltime can be directly back-projected in the velocity model: a positive time lag corresponds to a velocity model that is too fast; a negative time lag corresponds to a velocity model that is too slow. A different residual function can be obtained computing the cross-correlation of the synthetic and observed data and penalizing the nonzero lags of the cross-correlation (van Leeuwen and Mulder, 2008):

$$r(t) = \sum_\tau P(\tau)((d^{syn}(t) *_\tau d^{obs}(t)).$$

The asterisk denotes the cross-correlation operation, the variable $\tau$ indicates the cross-correlation lag in the time domain, the penalty operator $P(\tau)$ can be any monotonic function of $\tau$ that is zero at $\tau=0$. In this case, the focus is only on the traveltime information and not on the amplitude error in the data. If the velocity model is incorrect, the cross-correlation of the synthetic and observed data shifts from the zero lag and indicates the sign of the velocity error. The penalty operator annihilates the signal around zero lag and highlights the traveltime mismatch.

Image Space Residuals

In migration velocity analysis, the residual $r(x)$ is computed using the source and receiver wavefields extrapolated in the subsurface model, and thus it is defined in the image space. Various measure of velocity error are reported in the literature, most of them are based on the curvature of the moveout observed in common-image gathers in various domains (offset, reflection angle, etc.). Recently, the focusing criterion (Shen and Symes, 2008; Symes, 2008; Sava and Vasconcelos, 2009) have been used for defining a residual in the image domain that represent a proxy for the velocity error. Both the construction of common-image gathers and the measure of focusing require the migration of all the data that illuminate the portion of the model under investigation.

An exemplary objective function used with the disclosed technique does not require the explicit construction of common-image gathers and operates directly on the migrated images. The design of this objective function follows from previous work on linearized wave-equation MVA (Perrone et al., 2012), which used the warping relationship between images to construct an image perturbation that measures the model error and drives the model update. For an exemplary embodiment, one estimates of the relative shifts between images using penalized local correlations (a bilinear operator) and is able to integrate this measure into a full-wavefield inversion algorithm using the adjoint-state method. One goal is to assess the correctness of the velocity model from a small subset of images from nearby experiments but including all the points in the image into the objective function and without increasing the computational cost. An objective is to trade complete illumination (necessary to measure focusing) at a single spatial location for subsurface aperture (i.e., all the points in the image illuminated by the shots under analysis). The measure of consistency based on the semblance principle is reviewed and introduced in Perrone et al. (2012), define a residual r(x) in the image space, and then formulate an objective function as the $l_2$ norm of the residual.

There are at least two options for measuring similarity between two images. The first one is to compute the pointwise difference, in which case the residual function is $$r(x) = R_{i+1}(x) - R_i(x), \quad (1)$$

where $R_i(x)$ and $R_{i+1}(x)$ are the migrated images for ith and (i+1)th shot, respectively. The two shots are assumed to be close and to image the same area in the subsurface. Plessix (2006) uses the energy of the image difference as a regularization term for full-waveform inversion and not as a stand-alone objective function. Notice that if the velocity model used in migration is severely inaccurate, one can have cycle skipping in the image space or, in other words, the difference between the two images can produce two events if the position of the same reflector in the two images changes more than a quarter of a wavelength. This problem is analogous to what happens in full-waveform inversion in the data space.

An alternative solution is to compute local correlations of the two images at each point x and penalize according to the local dip estimated from one of the images. This approach measures the relative shift of one image with respect to the other directly in the image space and can be used for velocity analysis. Our methodology is the dual in the image domain of the data correlation strategy developed by van Leeuwen and Mulder (2008) in the framework of full-waveform inversion. The residual is expressed as $$r(x) = \int P(x, \lambda) c_i(x, \lambda) d\lambda, \quad (2)$$

where $$c_i(x, \lambda) = \int_{w(x)} R_i\left(\xi - \frac{\lambda}{2}\right) R_{i+1}\left(\xi + \frac{\lambda}{2}\right) d\xi \quad (3)$$

is the local correlation of the images $R_i(x)$ and $R_{i+1}(x)$ (Hale, 2007b) and $P(x, \lambda)$ is a penalty operator that highlights the shift of the local correlation along the dip direction. The vector $\lambda$ denotes the correlation lag in the image space and the index i scans the shot position. Local Gaussian windows w(x) centered about the image points x weight the input images and allow computation of local cross-correlations.

The Imaging Condition

The residual r(x) in equation 2 is computed from the migrated images $R_i(x)$ and $R_{i+1}(x)$. The dependency on the source and receiver wavefields is hidden in the imaging condition we use to construct the migrated image. An image of the subsurface R(x) is conventionally computed as the zero-lag time correlation of the source and receiver wavefields:

$$R(x) = \int_T u_s(x, t) u_r(x, t) dt, \quad (4)$$

where T is the recording time interval in the data, or the zero-lag frequency correlation of the source and receiver wavefields:

$$R(x) = \int_\Omega \overline{u_s(x, \omega)} u_r(x, \omega) d\omega, \quad (5)$$

where the overbar denotes the complex conjugation operator and $\Omega$ denotes the frequency bandwidth of the signals.

Image Correlation Objective Function

One can restate the semblance principle as follows: if the velocity model is correct, two images from nearby experiments construct the final image along the direction of the reflectors (Perrone et al., 2012). This is equivalent to the standard assumption that, if the model is correct, the prestack image-cube is invariant with respect to the shot position, i.e., no moveout in the shot-domain common-image gathers (Xie and Yang, 2008).

The structural dip is an attribute that is commonly extracted in seismic processing (van Vliet and Verbeek, 1995; Fomel, 2002; Hale, 2007a). The similarity of two images along the structural dip can be measured by means of local correlations (Hale, 2007b). This idea can be illustrated on a simple model with a single horizontal density interface (See FIG. 1); the correct velocity model is constant and equal to 200 km/s. FIG. 2 shows the dip and apparent displacement vector field (white and black arrows, respectively) at particular spatial locations. Observe that the two vectors are orthogonal when the velocity model is correct.

The computation of the displacement field requires a highly nonlinear procedure, which extracts the maximum of the local correlations at every image point (Hale, 2007b). One reformulates the problem of evaluating the orthogonality between dip and displacement using local correlations (as defined in equation 3) penalized along the dip direction (FIG. 3). If the velocity model is correct, the maximum of the correlation lies along the reflector slope (FIG. 3(a)); otherwise, a deviation is observed that represents the relative shift of one image with respect to the other (FIG. 3(b)). To measure the shift between the two images, one considers the penalty operator $$P(x,\lambda) = \lambda \cdot v(x),$$

where $\lambda$ is the correlation lag vector and the dip vector v(x) is the normal to the reflector at x. The penalty operator P(x, $\lambda$) is a linear function in the dip direction (normal to the reflector) and the isopenalty lines are parallel to the reflector. The penalty operator is identically zero in the direction tangential to the reflector. The local correlation of the two images is an even function with respect to the direction of the reflector: it is so because the two images illuminate the same area of the model and are therefore similar. The penalty operator changes the symmetry of the local correlation: if the velocity model is correct, the product between P(x, $\lambda$) and c(x, $\lambda$) is an odd function in the dip direction and by stacking over the correlation lags we obtain zero (FIG. 3(a)); on the other hand, if the velocity model is incorrect, the maximum of the local correlation deviates from the direction of the reflector (FIG. 3(b)) and is enhanced by the penalty operator. The stack over the correlation lags does not sum to zero because the function is not odd in the dip direction and we obtain a measure of relative shift between the two images. Since the maximum of the local correlation is positive, the sign of the penalty operator in the dip direction indicates the direction of the relative shift of one image with respect to the other. FIG. 4 shows the local correlations, penalty operators, and penalized local correlations for a particular location on the reflector in the three cases in FIG. 2. The rows of FIG. 4 refer to different models (from top to bottom: a too high, the correct, and a too low velocity model). The point on the image has lateral position x=3.5 km and vertical that depends on the imaged reflector.

FIGS. 4(a), 4(d), and 4(g) show the local correlations computed from two nearby shots; observe the shift in the peak of the local correlation and the orientation of the correlation panels. FIGS. 4(b), 4(e), and 4(h) show the penalty operators that were used to highlight the inconsistency between the dip measured on the image and the local correlations. The orientation of the penalty operators does indeed depend on the measured dip. The applied tapering reduces truncation artifacts from the edges of the local correlation panels. FIGS. 4(c), 4(f), and 4(i) show the penalized correlations. The apparent shift is now clear as a sign unbalance in the panels. When the velocity model is correct, the penalized correlation is an odd function (i.e., zero mean value) (FIG. 4(f)); on the other hand, the panels lose their symmetry when the model is incorrect (FIGS. 4(c) and 4(i)). The sign of the mean value of the penalized panels measures the apparent shift between the two images.

The objective function is defined as:

$$\Im(m) = \frac{1}{2}\sum_i \|r_i(x)\|_x^2 = \frac{1}{2}\sum_i \left\| \int P(x,\lambda) c_i(x,\lambda) d\lambda \right\|_x^2,$$

where m represents the model parameters. FIG. 5 shows the values of the objective function for different constant perturbations of the model for the simple example shown in FIG. 1. The objective function is smooth and convex in the range of errors considered.

Computation of the Gradient with the Adjoint-State Method

Because of the dimensionality of the model, the optimization problem is addressed using a local gradient-based method (steepest descent, conjugate gradient, etc.) (Vogel, 2002). The computation of the derivative of the state variables with respect to the model parameters (Fréchet derivatives) is not practical (or even possible) because of the large number of dimensions of the model space. The adjoint-state method (Lions, 1972; Plessix, 2006) is an efficient algorithm that computes the gradient of an objective function, which depends on some variables that describe the state of the physical system under analysis (state variables), without computing the Fréchet derivatives of these variables with respect to the model parameters.

The adjoint-state method comprises four steps: the computation of the state variables, the computation of the adjoint sources, the computation of the adjoint-state variables, and finally the computation of the gradient of the objective function. The first and third step (the evaluation of the state and adjoint-state variables) require the solution of the wave-equation that governs the physics of the problem. The adjoint-state method is computationally efficient because only two wavefield simulations are required at each iteration for computing the gradient of the objective function instead of a simulation for each parameter in the model. The Fréchet derivatives of the state variables with respect to the model parameters are extremely big objects: they are defined in the space given by the Cartesian product between the space of the state variables and the space of the model. They are not practical to compute and impossible to store in memory for realistic case scenarios in exploration geophysics. Nonetheless, they describe the sensitivity of each state variable to changes in each model parameter and are a powerful tool for resolution analysis.

In the following, the generic state variable is referred to using the letter u, the adjoint sources are indicated as g, and the adjoint-state variables are designated by the letter a. For wavefield tomography, there are two adjoint sources per experiment i: the source wavefield $u_{s,i}(x, t)$ and receiver wavefield $u_{r,i}(x,t)$, where i represents the shot index.

The state variables u are obtained from the solution to the forward problem $$L(m)u=f, \quad (6)$$

where f is the source term vector, L(m) is the forward modeling operator, and m indicates the model parameters. L can be a one-way or two-way wave operator; thus one can use either downward continuation (Stolt, 1978; Gazdag and Sguazzero, 1984; Stoffa et al., 1990) or reverse-time migration (Baysal et al., 1983; McMechan, 1983) in the wavefield tomography procedure. Here, we consider a two-way wave operator (d'Alambert or Helmholtz), and m represents the squared slowness. As shown in the following, the choice of squared slowness is convenient because it simplifies the final calculation of the gradient and allows us to obtain an expression that is independent on the model parameters at the current iteration.

The adjoint sources g are the partial derivatives of the objective function with respect to the state variables:

$$g = \frac{\partial \Im}{\partial u}. \quad (7)$$

The actual expression of the adjoint sources depends on the objective function. The particular design of the objective function impacts the adjoint sources and characterizes the particular wavefield tomography strategy proposed. In the following sections, the expressions for the adjoint sources are derived for an objective function based on local image correlations (equation 6).

The adjoint problem is solved and the adjoint variables are computed using the adjoint sources g as the force term:

$$L^*(m)a=g, \quad (8)$$

where L*(m) is the operator adjoint to L(m). Finally, the gradient is given by the inner product $$\frac{\partial \Im}{\partial m} = -\left\langle a, \frac{\partial L}{\partial m} \right\rangle. \quad (9)$$

For example, for the Helmholz operator parameterized in terms of slowness squared, $L=-\nabla^2-m\omega^2$, the partial derivative $$\frac{\partial L}{\partial m}$$

returns a simple scaling factor $-\omega^2$, and the inner product $$\left\langle a, \frac{\partial L}{\partial m} \right\rangle = -\omega^2 \langle a, u \rangle$$

can also be seen as the zero-lag correlation of u and a, similar to the procedure employed in conventional FWI.

Adjoint Sources

As described in the previous section, the adjoint sources $$g = \frac{\partial \mathcal{J}}{\partial u}$$

are the derivatives of the objective function with respect to the state variables. In our objective function, one considers the dip field a slowly varying function of state variables and neglects the derivative of the penalty operator with respect to u. The details of the derivation of the expressions for the adjoint sources are detailed later; here, the final result is reported as:

$$g_{s,i} = u_{r,i}(\eta, t)\left[r_{i-1}\int P(x,\lambda)w\left(x - \eta + \frac{\lambda}{2}\right)R_{i-1}(\eta - \lambda)d\lambda + \right. \quad (10)$$
$$\left. r_i \int P(x,\lambda)w\left(x - \eta - \frac{\lambda}{2}\right)R_{i+1}(\eta + \lambda)d\lambda\right],$$

and $$g_{r,i} = u_{s,i}(\eta, t)\left[r_{i-1}\int P(x,\lambda)w\left(x - \eta + \frac{\lambda}{2}\right)R_{i-1}(\eta - \lambda)d\lambda + \right. \quad (11)$$
$$\left. r_i \int P(x,\lambda)w\left(x - \eta - \frac{\lambda}{2}\right)R_{i+1}(\eta + \lambda)d\lambda\right],$$

where $g_{s,i} = g_{s,i}(x, \eta, t)$ and $g_{r,i} = g_{r,i}(x, \eta, t)$ indicate the adjoint sources for the source and receiver wavefield of the ith shot, respectively, and $r_i = r_i(x)$ is defined as in equation 2.

The expressions of the adjoint sources in equation 10 and 11 are quite complex and need to be explained in some detail. Notice that the adjoint sources depend on 3 variables (x, η, t). The vector x represents the physical space, where model and image are defined; the variable t identifies the time axis; η is an auxiliary vector defined in the physical space that spans the local window around every image point.

The adjoint source is obtained by spreading the value of the residual at each point in a window around the image point and by weighting it by the integral over λ, which represents a local convolution of the image and the penalty operator. The residual in equation 2 measures the relative displacement of one image with respect to the other; the adjoint source thus estimates the curvature of the moveout in the shot-domain common-image gathers at each image point and scales the background wavefields by this value.

Equations 10 and 11 depend on two images, $R_{i-1}(x)$ and $R_{i+1}(x)$, and may suffer from cycle skipping if the distance between the two shots and the model complexity cause the reconstructed reflectors to be more distant than a quarter of a wavelength. In order to overcome this problem, one uses the central image $R_i(x)$ to compute the adjoint sources.

The dependence of the penalty operator $P(x, \lambda)$ on the state variables u passes through the definition of the dip vector v(x), which is normal to the reflectors at every point in the image. The dip field defines the wavefront set of the function that represents the reflection events in the image (Chang et al., 1987); the link between the image (and the wavefields) and the dip field can be written exploiting the concept of gradient square tensor (van Vliet and Verbeek, 1995): the dip vector is the eigenvector associated with the largest eigen values. There is no simple linear relationship between the dip vector and the wavefields, i.e., the state variables. Neglecting this term in the computation of the adjoint sources may introduce an error of the same order of magnitude of the term considered. A thorough study of ∂P/∂u and its impact on the computation of both the adjoint sources and the gradient of the objective function is a subject for future research.

In the following test, the simple density interface in FIG. 1 and three shots 60 m apart starting from x=4 km were considered. The data are computed in a constant 2.0 km/s velocity medium using a two-way finite-difference scheme. One migrates the data with three different slowness models and performs sensitivity analysis for the methodology. The residuals, the objective function as a function of the model perturbation, and the gradient with respect to the model parameters are shown.

Flat Reflector in a Constant Velocity Medium

FIG. 6 shows the migrated images of a shot located at x=4 km using three different velocity models. Observe that with a single shot, the image of a horizontal reflector curves up or down depending on the sign of the velocity error. The relative displacement between different images is measured by the residual defined in equation 2. FIG. 7 shows the residuals calculated using two images from adjacent shots. Observe the change in sign across the zero-offset reflection point and how the sign changes with the velocity error. The shift between the images tells us that the velocity model contains errors but it does not unequivocally relate with the sign of the error. One can combine the residuals and obtain an estimate of the curvature of the shot-domain common-image gathers (FIG. 8) that is more directly connected to the sign of the velocity error. The sign flip at the edges of the reflector are due to the limited aperture of the experiment and the fact that the three images do not overlap over the entire extent of the reflector.

In FIG. 9, the gradient computed from the correlation objective function is shown. Three shots were considered to compute the residuals and to use only the wavefields of the central experiment to compute the gradient. Observe the correlation between the sign and pattern of the curvature estimate in FIG. 8 and the computed gradient of the objective function. The gradient of the objective function represents the direction of maximum increase of the function itself and its sign depends on the chosen parameterization. One then computes the gradient with respect to slowness squared; this means that a positive gradient points toward slower models whereas a negative gradient points toward faster models.

EXAMPLES

One computes the gradients for the objective function based on local image correlations using the adjoint-state method and show a few inversion tests. 3 cases of increasing complexity are discussed. First, a horizontal density interface (FIG. 1) in a homogeneous slowness model is considered. 30 sources evenly spaced 200 m apart are used at the surface and receivers are located at every grid point at z=0. This demonstrates how the model is updated through inversion by means of a gradient-based method and the adjoint-state method. Second, an inversion test is run on a simple heterogeneous model with different layers using 40 shots evenly spaced 200 m apart and receivers at every grid point on the surface. Shot-domain common-image gathers are used to assess the quality of the result and to show that the exemplary methodology is able to obtain a set of images that is invariant with respect to the experiment position. The final test uses the Marmousi model. The data are generated with a single scattering code and migrated with a downward continuation scheme.

Homogeneous Slowness Model

The simple model in FIG. 1 is considered with a single horizontal density interface. The data are generated using a time-domain finite difference code with absorbing boundary conditions implemented on all sides of the model. Random Gaussian noise is added to the data and the signal-to-noise ratio is equal to 10. The correct model (FIG. 10) is a homogeneous slowness layer and the initial model is homogeneous but with an incorrect value of slowness (FIG. 11($a$)). 30 shots at the surface are modeled starting from x=1.01 km; the spacing between the shots is 200 m and the 400 receivers are located at every grid point on the surface.

In the image obtained with the initial model (FIG. 11($b$)), the reflector is mispositioned because of the erroneous value of the model parameters; the shot-domain common-image gathers computed for illustration purposes show that different shots image the reflector at different depths (FIG. 11($c$)). Five iterations of steepest descent (Vogel, 2002) were run and the slowness model above the reflector (FIG. 12($a$)) reconstructed. The migrated image obtained with the final model (FIG. 12($b$)) is shifted upward as a result of the higher slowness value. The common-image gathers in FIG. 12($c$) show the focusing obtained with the reconstructed model. The far left and far right edges of the reflector show residual curvature, which is due to the lack of illumination and of constraints from the data. The lack of illumination leads to a higher value of slowness in the central part of the model: the inversion compensates the lower slowness on the sides with a higher slowness in the middle. Observe the rapid decrease of the objective function as the gathers are flattened (FIG. 13).

Synthetic Laterally Heterogeneous Model

One uses the synthetic heterogeneous model in FIG. 14 to test the inversion algorithm. The model has a few layers with different dips and an incline structure with an inversion in the otherwise decreasing slowness trend. One generates full-acoustic (i.e., non-Born) data with absorbing boundary conditions (no free-surface multiples) and random Gaussian noise with a signal-to-noise ratio equal to 10. One embodiment models 40 shots evenly spaced 200 m apart and receivers at every grid point on the surface. The initial model is heavily smoothed in FIG. 14 and the initial slowness model for migration obtained (FIG. 15($a$)). FIG. 15($b$) shows the stack of the migrated images obtained from the initial model; if one compares the correct model in FIG. 14 and the migrated image one can observe the mispositioning of the reflecting interfaces.

A 10 shot-domain common image gathers is constructed to assess the overall focusing of the image. These gathers are simply the juxtaposition of the migrated images at fixed lateral positions (from x=0 km to x=9 km every 1 km).

FIG. 15($c$) shows such gathers for the initial model: the position of the reflectors changes as a function of experiment (the images do not satisfy the semblance principle) and the model is thus not accurate. After 15 waveform tomography steps the model in FIG. 16($a$) is recovered. The model is still quite smooth but the migrated image shows a noticeable improvement in the position of the reflectors (FIG. 16($b$)), and the shot-domain common-image gathers in FIG. 16($c$) clearly indicate better focusing. Moreover, the sign of the reflectors is now consistent with the actual slowness contrasts in the exact model. Conformity is imposed between the model update and the layers in the image by means of a structure-oriented smoothing operator, which steers the gradient of the objective function by smoothing along the reflector slope. This approach is conceptually similar to the sparse inversion proposed by Ma et al. (2010).

FIG. 17 shows the evolution of the objective function with iterations. Notice the monotonic decrease in the value of the residual and the flattening when the algorithm converges. The inversion also shows a rapid convergence in the very first iterations of steepest-descent: the structure-oriented smoothing forces the gradient to conform to the geometry of the layers and speeds up convergence to an acceptable model. Despite the simplicity of the model, the inaccuracy of the wave kinematics and the absence of overturning energy (diving waves) make the data-domain techniques (such as full waveform inversion) ineffective in this particular case.

Marmousi Model

A more complex inversion test is setup using the Marmousi model. Here, one models the data using a finite-difference single-scattering (i.e., Born) modeling code and absorbing boundary conditions on the 4 sides of the model. 78 shots were simulated, the spacing between the shots is 0.08 km, and the first source is at x=0.96 km; receivers are placed at every grid point at z=0 km. Conflicting dips are not yet handled correctly by one exemplary embodiment because they make the definition of the penalty operators ambiguous. For this reason, the inversion is restricted to the first 1.5 km in depth, where the reflectors are more coherent.

The initial model is a heavily smoothed version of the correct Marmousi slowness model. FIG. 18 shows the initial slowness model, the associated migrated image, and shot-domain common-image gathers extracted every 1 km from x=0 km. Because of the regularity of the geologic structures in the shallow part of the model, the migrated image is not severely distorted, nonetheless the reflectors are mispositioned and the faults are not correctly focused. The shot-domain common-image gathers (FIG. 18($c$)) show variation of the depth of imaged reflectors as function of experiment, which indicates model inaccuracy.

14 iterations of steepest-descent were run and the results obtained in FIG. 19. The slowness model is corrected by the inversion procedure and the imaged interfaces are moved toward the correct position. The fault planes are better focused and we reduce the interface crossings at the unconformities (x=3 km, x=4 km and x=5 km). The shot-domain common-image gather in FIG. 19($b$) shows flatter horizontal events that indicate a more accurate kinematic model, and additional events are focused at the bottom of the model (at about z=3 km). Observe also that the common-image gathers in poorly or non illuminated parts of the model contribute mainly migration noise and thus cannot be used to assess the correctness of the velocity model.

In FIG. 20, the objective function shows a constant decrease. The residuals are computed over the entire image but one exemplary embodiment uses only the points in the first 1.5 km in depth to update the velocity model. For complex areas with conflicting dips and complicated geologic features (where there is no clear definition of the dip field), a more sophisticated design of the penalty operator is key to obtaining meaningful residuals and a reliable gradient. The eigenvalues and eigenvectors of the gradient square tensors (van Vliet and Verbeek, 1995) can be used to define ellipses that, in turn, may offer a structure oriented criterion for the definition of the penalty operators.

A complete image of the subsurface is the superposition of partial images from individual experiments. The semblance principle (Al-Yahya, 1989) is one common criterion for assessing the correctness of the velocity model used for imaging the survey: when the velocity model is correct, all shots locate reflectors at the same position, i.e., the image is invariant along the experiment axis. Several shots are needed to evaluate a velocity error at a single point in space.

One can evaluate the invariance along the experiment axis by computing the energy of the first derivative in that dimension. The first derivative acts as a penalty operator by highlighting and enhancing deviations from the horizontal direction along the shot axis. The stack of the energy of the first derivative is the differential semblance operator applied directly in the shot domain (Symes, 1991; Plessix, 2006).

Here, an alternative statement of the semblance principle is explored: when the velocity model is correct, images from different shots constructively interfere and build up the image perpendicular to the structural dip or, equivalently, parallel to the reflector slope, at every point in the image space. The structural dip is a commonly extracted attribute and can be linked to the image itself by means of the gradient square tensors (van Vliet and Verbeek, 1995). Unfortunately, the relationship between wavefields and the dip field is nonlinear: the dip vector represents the eigenvector associated with the largest eigen value of the gradient square tensor. The integration of information about the dip variation with respect to model perturbation is not straightforward, and further research is needed to develop an efficient method to exploit this information for velocity analysis purposes. Nonetheless, one is able to measure the semblance of two images through appropriately penalized local correlations of pairs of images. If the velocity model is correct, the maximum of the local correlation is along the reflector at every point in the image; if the model is incorrect, the maximum deviates from the reflector slope. The penalty operator is space-dependent and annihilates the correlation panels orthogonal to the reflector dip. Because of the dependency on the velocity model, one measures the dip field at each tomographic iteration; the estimation can be carried out efficiently using gradient square tensors (van Vliet and Verbeek, 1995; Hale, 2007a).

The correlation objective function is superior to the image difference in many respects. First, the difference between two images depends on image amplitudes that change as a function of the shot position and cannot be matched pointwise as in the standard implementation of full-waveform inversion in the data space. The amplitude patterns affect the residual in the image space and effectively contribute to the adjoint source calculation, even if the velocity model is correct and the gradient of the objective function is zero (Mulder and Kroode, 2002). By penalizing local correlations, one reduces the dependence of the objective function on amplitudes, thus increasing the robustness and reducing the systematic bias caused by the amplitude differences between the images. A downside of the correlation operator is the loss of spatial resolution. Correlation in the spatial domain is equivalent to multiplication in the dual frequency/wavenumber domain; for signals with both finite spatial support and bandwidth, the multiplication of the spectra decreases the bandwidth, i.e., increases the width of the signal in the spatial domain. To increase the resolution and accuracy of the evaluation of the relative shifts between images, deconvolution is a viable improvement over correlation. If one assumes that two images from nearby experiments are linked by a simple spatial shift, a local deconvolution approach would ideally produce a band-limited spatial delta function indicating the direction of apparent displacement. On the other hand, since deconvolution amplifies the noise in the data (because of the division in the frequency domain), additional care is necessary to stabilize the result.

A thorough study of the effect of the shot distance on the computed gradient would be beneficial in relation to phenomena such as cycle skipping, which hinders many velocity analysis strategies (especially in the data domain but not exclusively). The image domain is intrinsically less prone to cycle skipping problems; nevertheless the question remains about what happens when two images illuminate rather different areas of the subsurface and the local correlations cannot be used to estimate a reliable and meaningful shift between the two images. From our current knowledge and understanding, the shots must be close enough to provide comparable images of the subsurface and avoid cycle skipping in the image domain. The sampling of the shot position and the illumination pattern in the subsurface can also create a scenario in which the two images do not overlap in certain local windows.

The exemplary method is based on locally coherent events, such as locally smooth reflectors. Conflicting dips, fault planes, and areas where the definition of a reflection plane is ambiguous represent open problems because in these areas penalty operators cannot be defined. In this respect, plane-wave migration may represent a valid solution because of the implicit spatial filtering of the image: each plane-wave reconstructs a particular subset of the dips in the model, thus reducing the ambiguity in defining the penalty operators.

In contrast with other techniques in the image space (Bishop et al., 1985; Biondi and Symes, 2004; Lambaré et al., 2004; Xie and Yang, 2008; Yang and Sava, 2010, 2011), one does not need to compute image gathers (or extended images). A further cost-saving factor is given by the selection of points on the imaged reflectors (Yang and Sava, 2010) and away from complex areas (pinch-outs or areas with conflicting dips). The computation of the local correlation is carried out at every image point using the efficient method developed by Hale (2006).

The ability to extract velocity information from pairs of experiments adds a new degree of freedom for implementing a model update procedure. Here, the technique indicates two possible strategies. One can simultaneously include all the shots in the survey in the definition of the objective function or one can proceed iteratively and update the velocity model using the information obtained from a single pair of experiments before moving to the next pair. Nearby shots probe similar portions of the model and provide comparable images; one can use the information extracted from an initial group to update the model used for imaging a second group of experiments. Since in any migration velocity analysis scheme one has to image the entire survey at least once, the iterative update of the model over shots becomes cost-effective if one actually reduces the number of global migrations of the entire dataset.

In 2D, one can easily define an order for the experiments; in the general 3D scenario, one has one extra degree of freedom. The definition of the objective function remains the same but a given shot can have more than 2 neighboring experiments (the acquisition is defined on a bidimensional grid). One can generalize the concept of correlation using the semblance functional (Taner and Koehler, 1969), which is nonlinear in the input signals and makes the computation of the gradient more involved. One can also separately analyze each pair of experiments given a reference model.

Further research and numerical tests are needed to assess efficiency and robustness of one strategy over the other.

Aspects of the invention are thus directed to a method, system, means and/or computer program for analyzing seismic image data, comprising:

receiving a first data set, the first data set representing image data obtained from seismic receivers in a first position relative to a geological structure;

receiving a second data set, the second data set representing image data obtained from seismic receivers in a second position relative to the geological structure; and measuring relative movement of the second image data as compared to the first image data with respect to a structural element of the geological structure.

Aspects are further directed toward the structural element comprises a structural dip.

Aspects are further directed toward comparing, using a computer, the first data set with the second data set; and measuring inconsistencies between the first and second data sets as phase shifts in the image space.

Aspects are further directed toward constructing, from the first and second data sets, an objective function.

Aspects are further directed toward wherein the objective function comprises measuring a mismatch between synthetic and recorded wavefields.

Aspects are further directed toward wherein the objective function is encoded in terms of focusing.

Aspects are further directed toward wherein the objective function is encoded in terms of local semblance.

Aspects of the invention are thus directed to a method, system, means and/or computer program analyzing seismic image data comprising:

obtaining a first set of data from a first seismic experiment;

making a first image from the first set of data;

obtaining a second set of data from a second seismic experiment;

making a second image from the second set of data;

measuring, by a computer, a similarity between the first and second image; and based on the similarity between the first and second image, defining an objective function which minimizes as the similarity between the first and second image increase.

Aspects are further directed toward designing a tomographic procedure to determine a minimum of the objective function.

Aspects are further directed toward wherein the first and second seismic experiments illuminate the same geologic structure.

Aspects of the invention are thus directed to a method, system, means and/or computer program that analyzes seismic image data, comprising:

a storage device that receives a first data set, the first data set representing image data obtained from seismic receivers in a first position relative to a geological structure and receives a second data set, the second data set representing image data obtained from seismic receivers in a second position relative to the geological structure; and a velocity model estimation module that measures relative movement of the second image data as compared to the first image data with respect to a structural element of the geological structure.

Aspects are further directed toward wherein the structural element comprises a structural dip.

Aspects are further directed toward a processor that compares the first data set with the second data set and measures inconsistencies between the first and second data sets as phase shifts in the image space.

Aspects are further directed toward an objective function module that constructs, from the first and second data sets, an objective function.

Aspects are further directed toward wherein the objective function comprises measuring a mismatch between synthetic and recorded wavefields.

Aspects are further directed toward wherein the objective function is encoded in terms of focusing.

Aspects are further directed toward wherein the objective function is encoded in terms of local semblance.

Aspects of the invention are thus directed to a method, system, means and/or computer program to estimate a velocity model from seismic data comprising:

receiving seismic data;

estimating a velocity model utilizing an objective function that measures, using a microprocessor, a mismatch between synthetic and recorded wavefields in the seismic data; and storing an updated velocity model based on a gradient.

Aspects are further directed toward wherein velocity information is extracted directly in an image domain.

These and other features and advantages of this invention are described in, or are apparent from, the following detailed description of the exemplary embodiments.

BRIEF DESCRIPTION OF THE FIGURES

The exemplary embodiments of the invention will be described in detail, with reference to the following figures. It should be understood that the drawings are not necessarily shown to scale. In certain instances, details which are not necessary for an understanding of the invention or which render other details difficult to perceive may have been omitted. It should be understood, of course, that the invention is not necessarily limited to the particular embodiments illustrated herein.

$$\frac{\Delta m}{m} = 10\%, \quad (a)$$

$$\frac{\Delta m}{m} = 0, \quad (b)$$

and $$\frac{\Delta m}{m} = 10\%. \quad (c)$$

The correct slowness value is 0:5 s/km.

Figure 3:
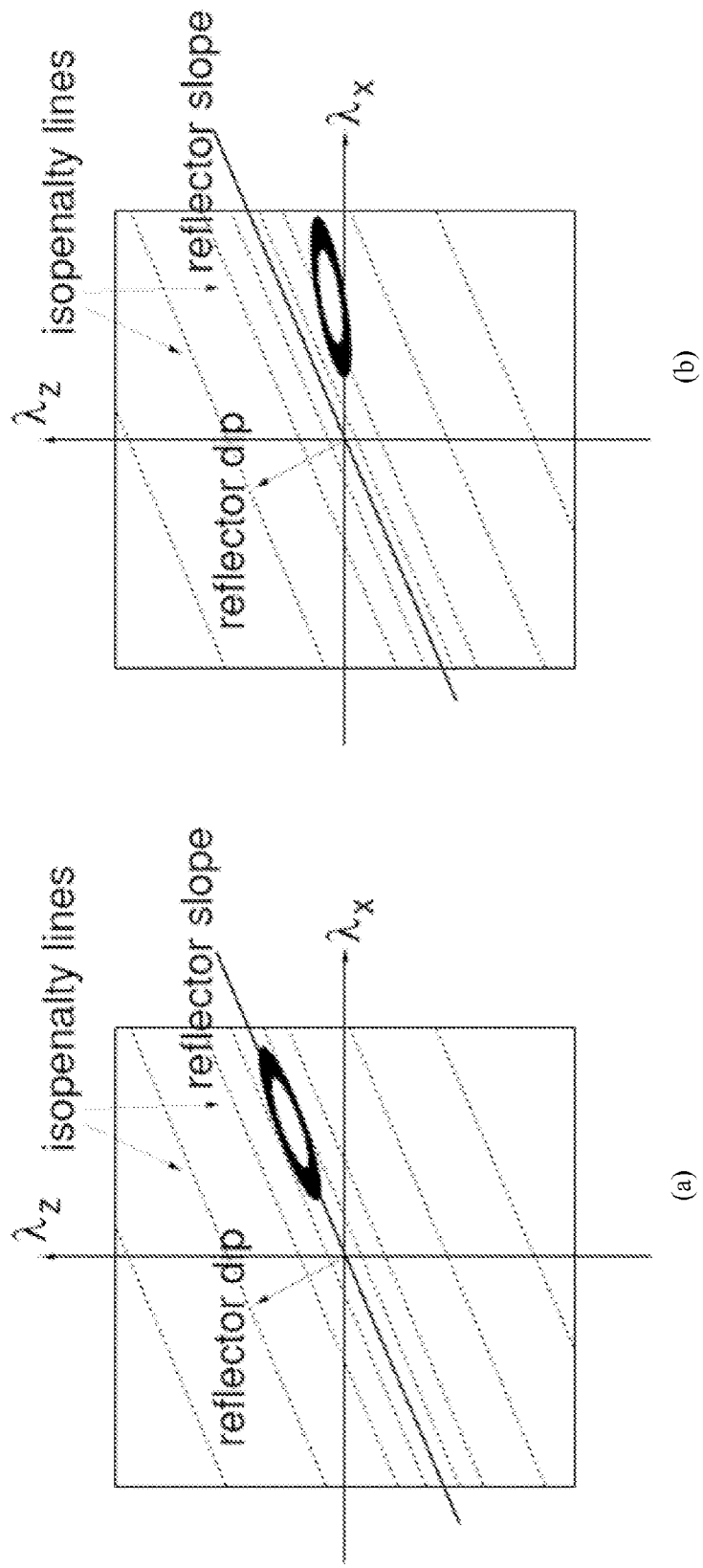

FIG. 3 describes the behavior of local correlations for the correct and for a incorrect model. When the model is correct, the maximum of the correlation of two images is aligned with the slope of the reflector (a), otherwise, the maximum of the correlation deviates (b).

Figure 2:
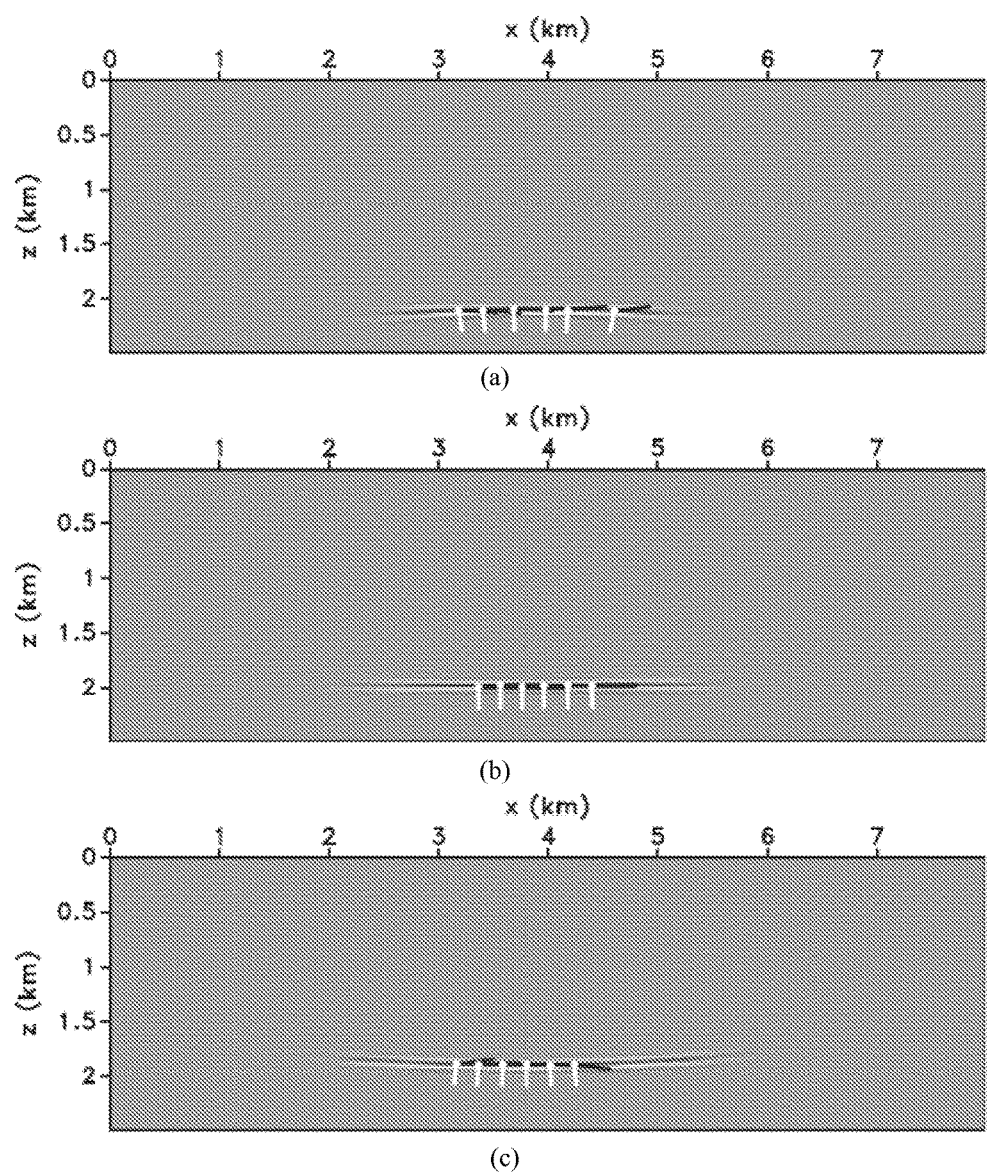
FIG. 2 illustrates the relationship between the dip field and the apparent displacement: dip (white) and displacement (black) vector fields for different values of slowness error for a single horizontal reflectors.
Figure 4:
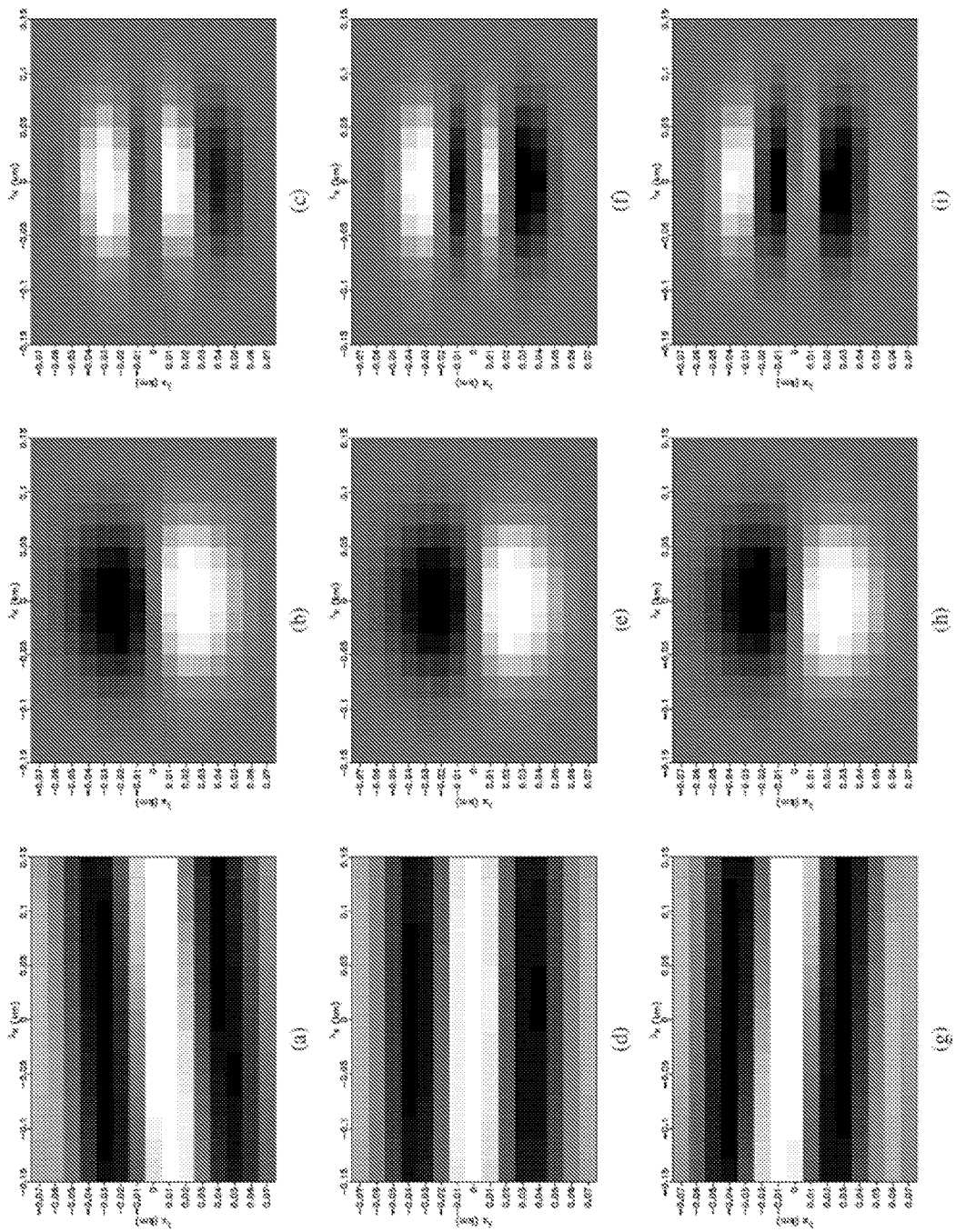

FIG. 4 illustrates the measure of the relative displacement between two images using penalized local correlations. 2 images were considered from nearby experiments of the reflector in FIG. 2; each row (from top to bottom) represents a different model: too high, correct, and too low; the columns show (from left to right) the local correlation panel, the penalty operator used, and the penalized local correlation. For each model, a point on the reflector was picked with lateral coordinate x=3:5 km. The vertical coordinate changes as a function of model parameters because the depth of the reflector changes. Observe the asymmetry of the penalized local correlations for the wrong models: the mean value (i.e., the stack over the correlation lags) of the penalized correlations gives us a measure of the relative shift between two images.

Figure 5:
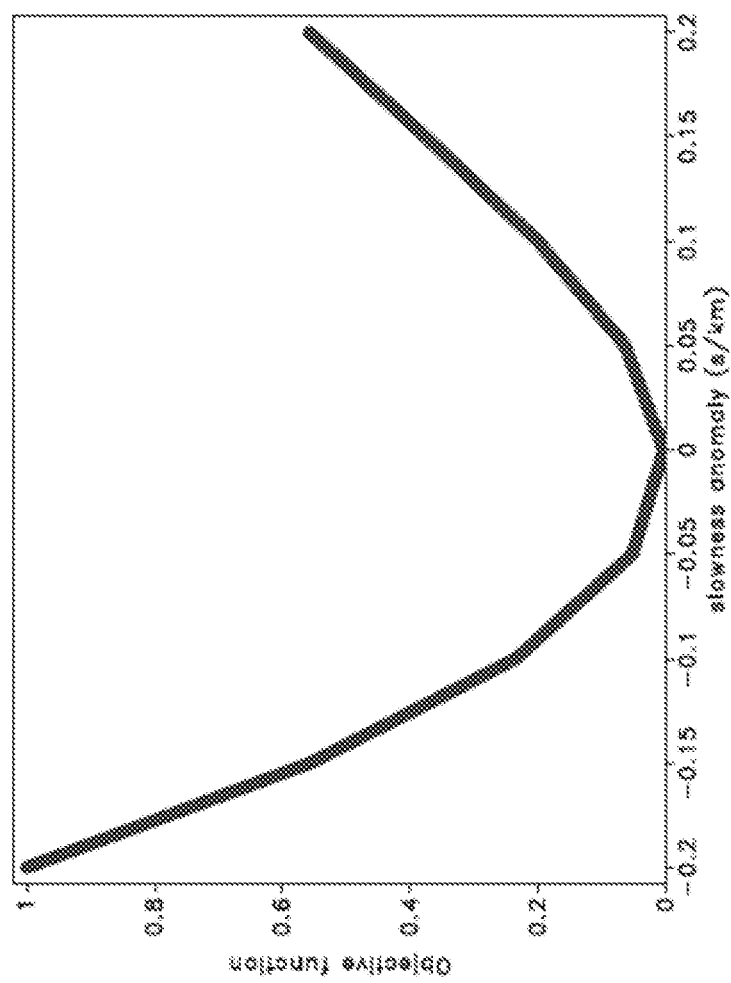

FIG. 5 illustrates values of the objective function for different errors in the slowness model. Constant perturbations were considered ranging from −10% to 10% of the exact value (0.5 s/km).

Figure 1:
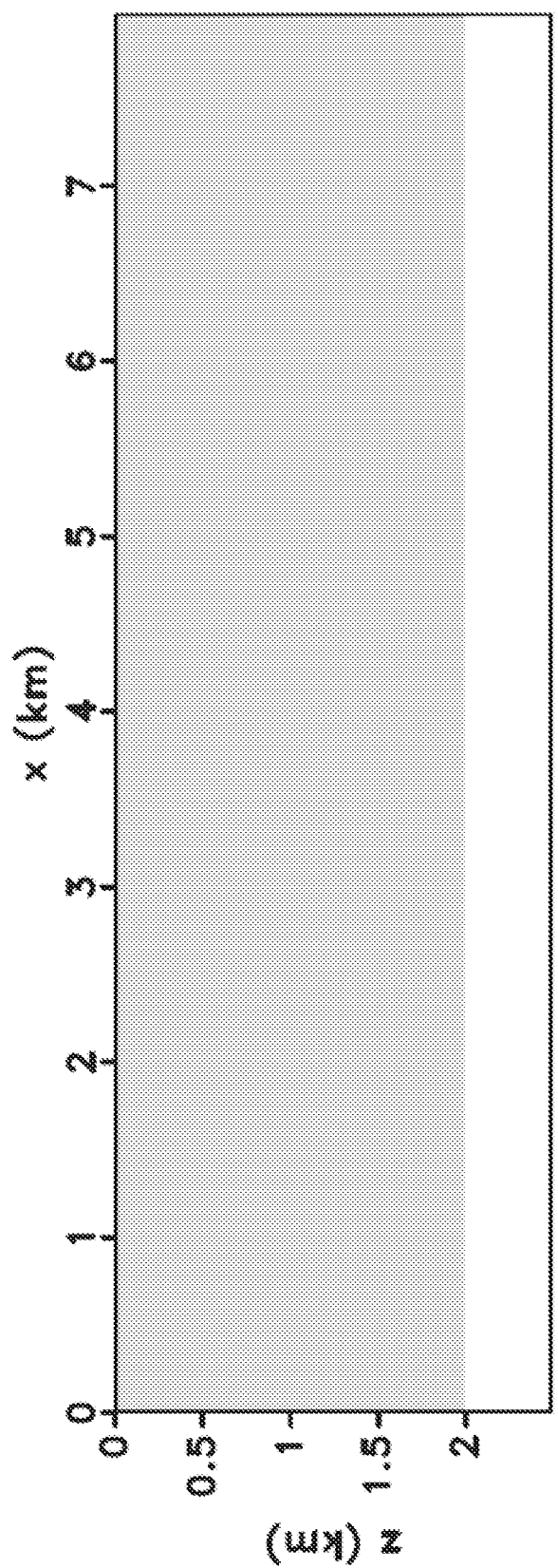
FIG. 1 illustrates a Test model: single horizontal density interface in a constant 0:5 s/km slowness medium. The lighter shades of grey correspond to higher values of density.
Figure 6:
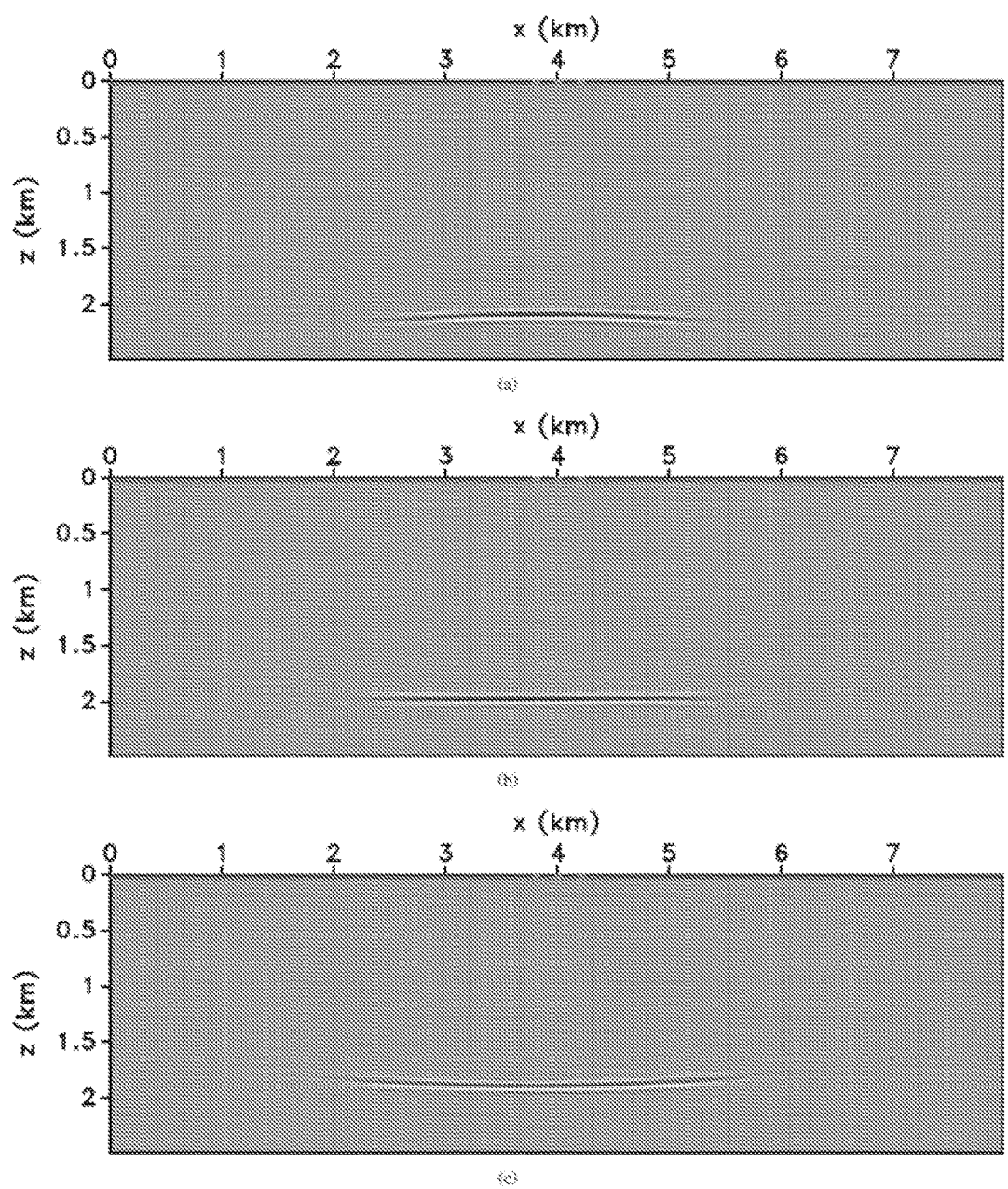

FIG. 6 illustrates the simple model in FIG. 1 being considered. Here, the data is migrated with a slowness model that is too low (a), correct (b), and too high (c). The slowness squared error is constant across the entire model and equal to 10% of the background. The correct slowness value is 0.5 s/km.

Figure 7:
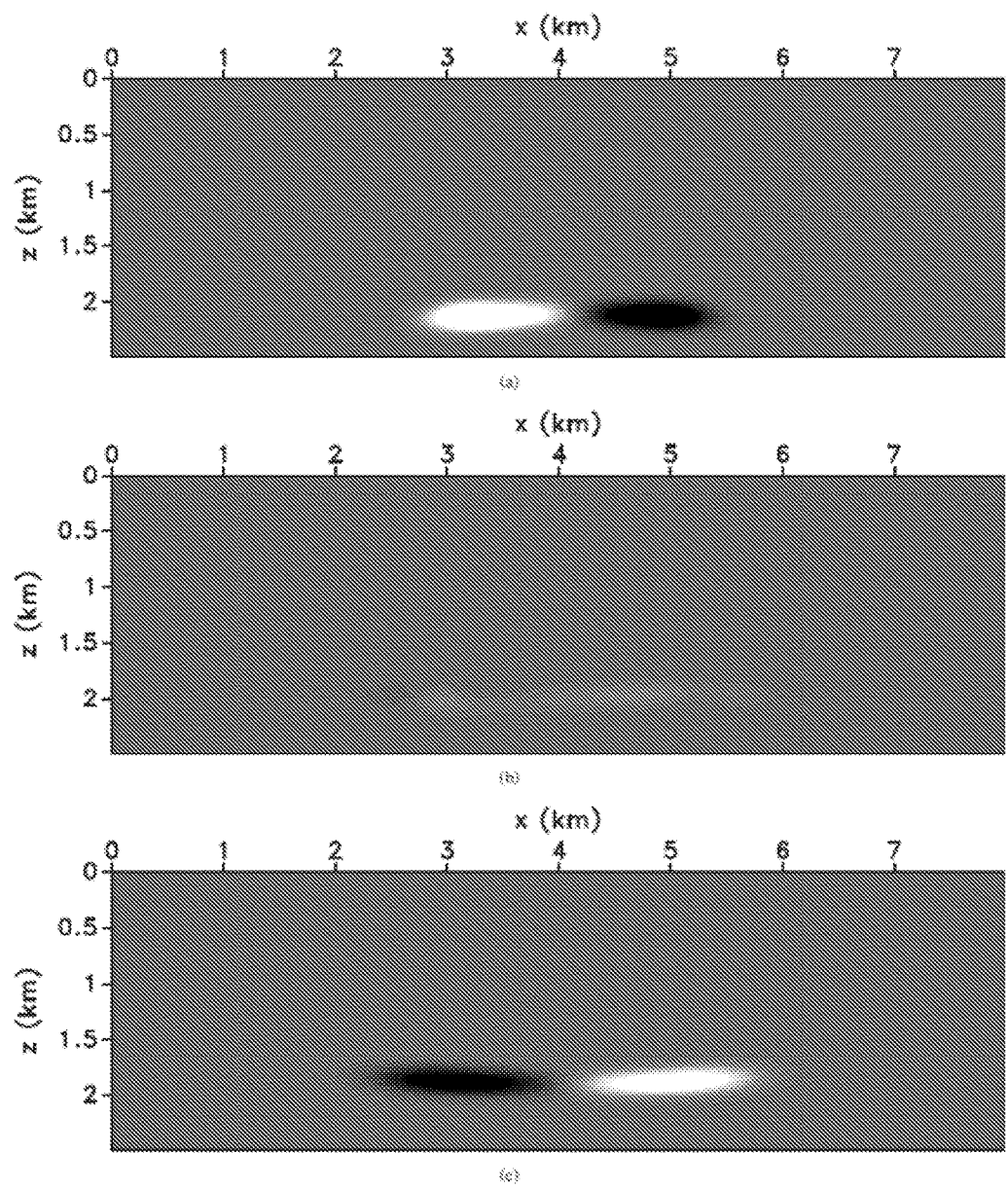

FIG. 7 illustrates the three cases in FIG. 6, where the residuals according to Equation 2 were computed. The sign of the residual indicates the relative displacement of one image with respect to the other.

Figure 8:
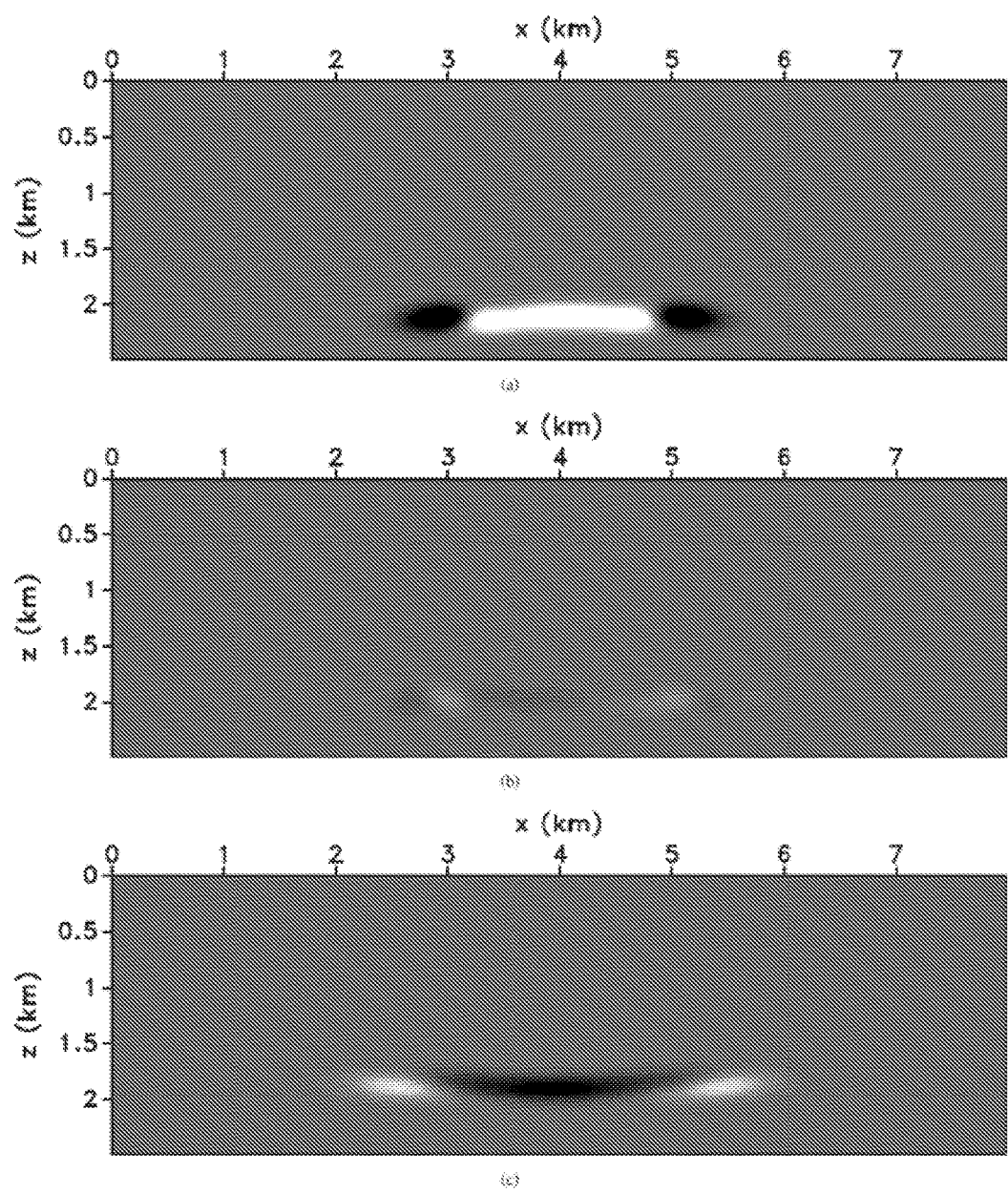

FIG. 8 illustrates the difference between the residuals from adjacent experiments give us an estimate of the curvature of the shot-domain common-image gathers. This information correlates well with the velocity error in the model.

Figure 9:
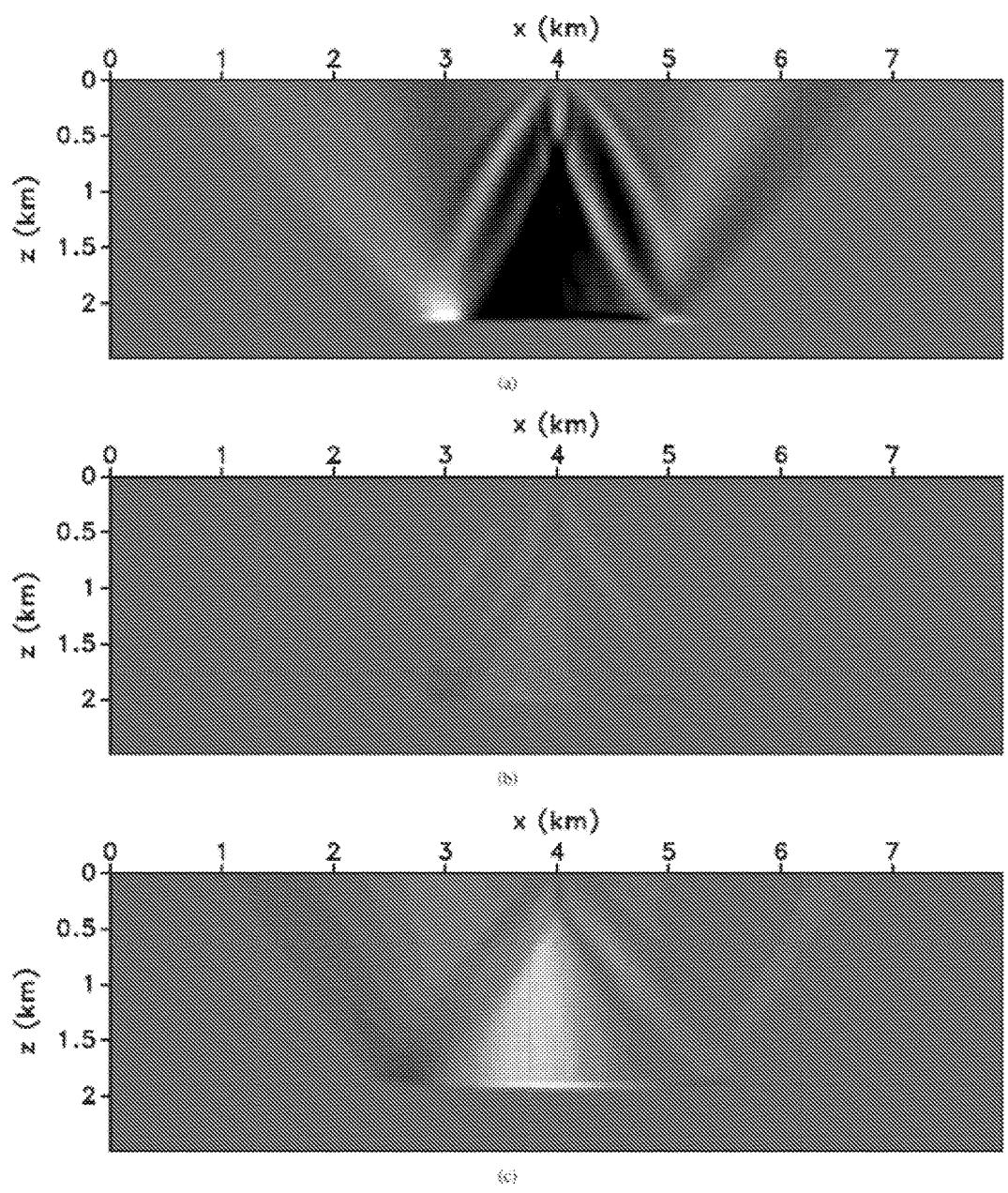

FIG. 9 illustrates the gradient of the correlation objective function for a slowness model that is too low (a), correct (b), and too high (c). The slowness squared error is constant everywhere and equal to 10% of the background. The distance between the two shots is 60 m. Here, three shots were considered and the gradient computed using the wavefields of the central experiment.

Figure 10:
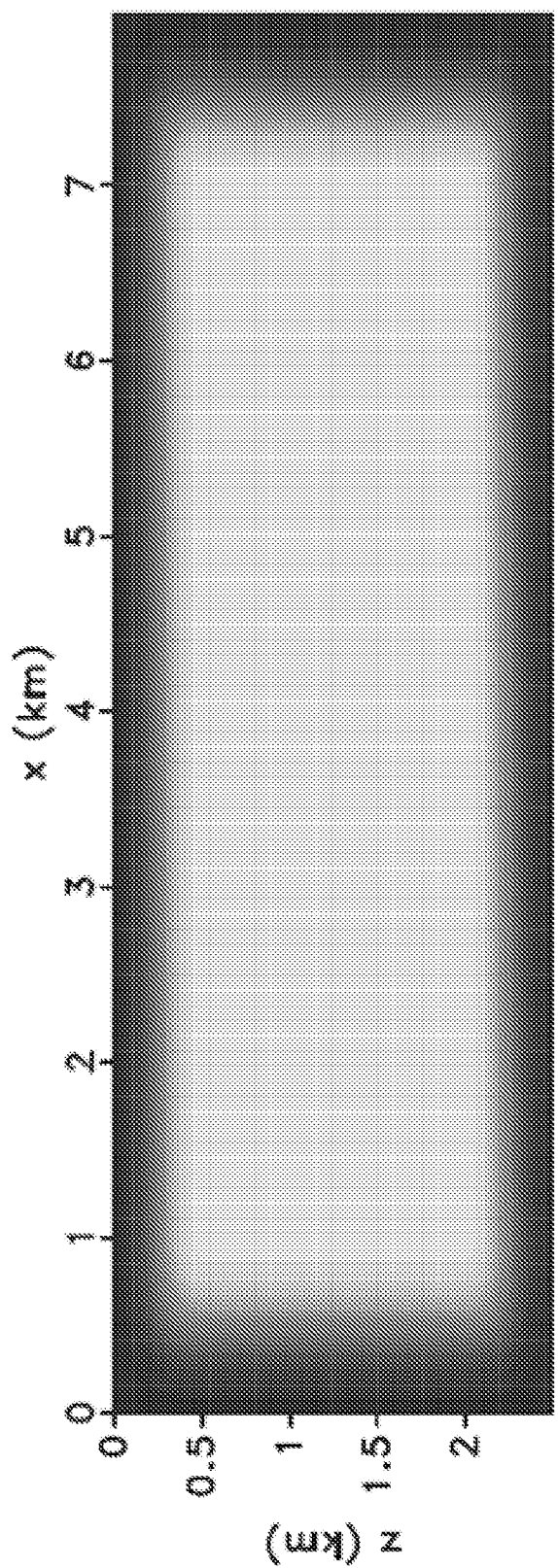

FIG. 10 illustrates the slowness model used to generate the full-acoustic data. Absorbing boundary conditions have been applied at all sides of the model. The lighter shades of grey indicate higher slowness.

Figure 11:
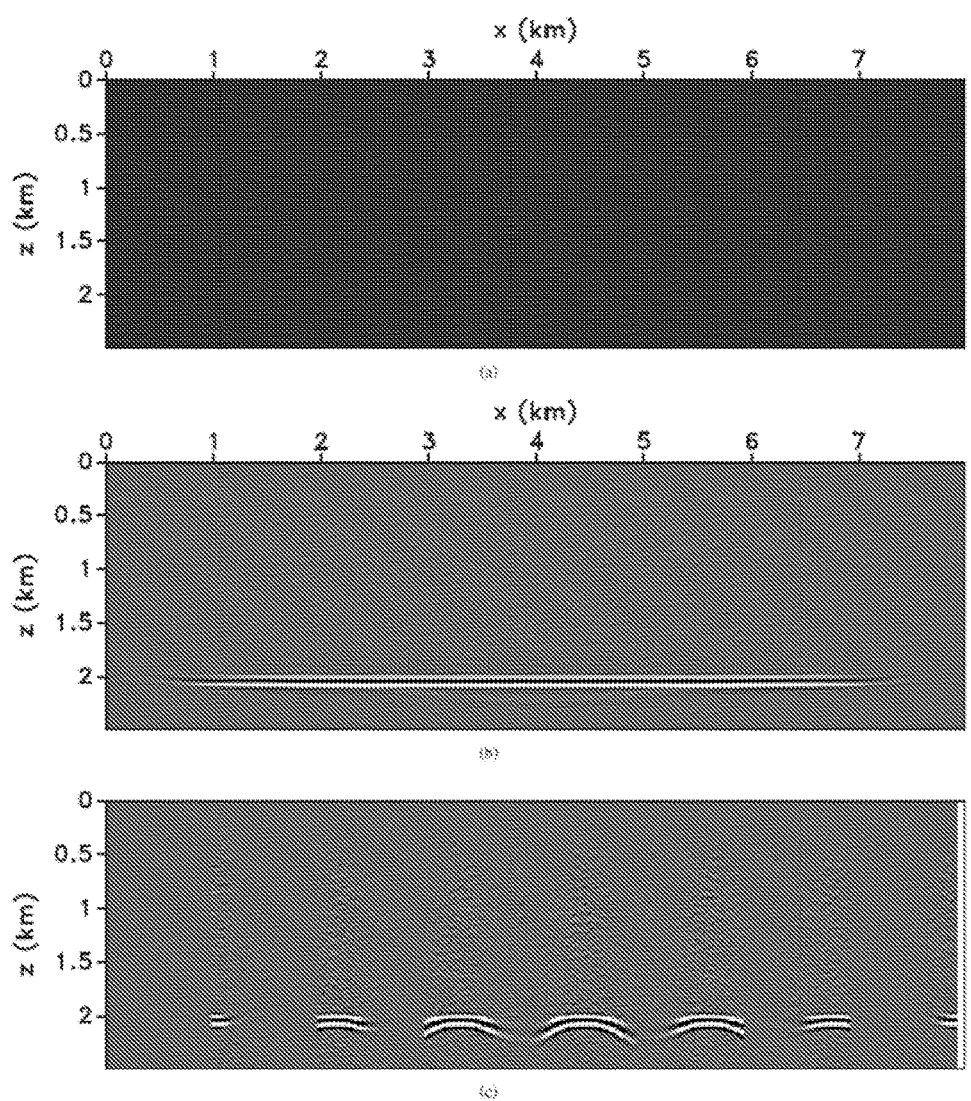

FIG. 11 illustrates an initial slowness model (a), associated migrated image (b), and shot-domain common-image gathers (c). Observe the curvature of the gathers: different experiments image the reflector at different depths.

Figure 12:
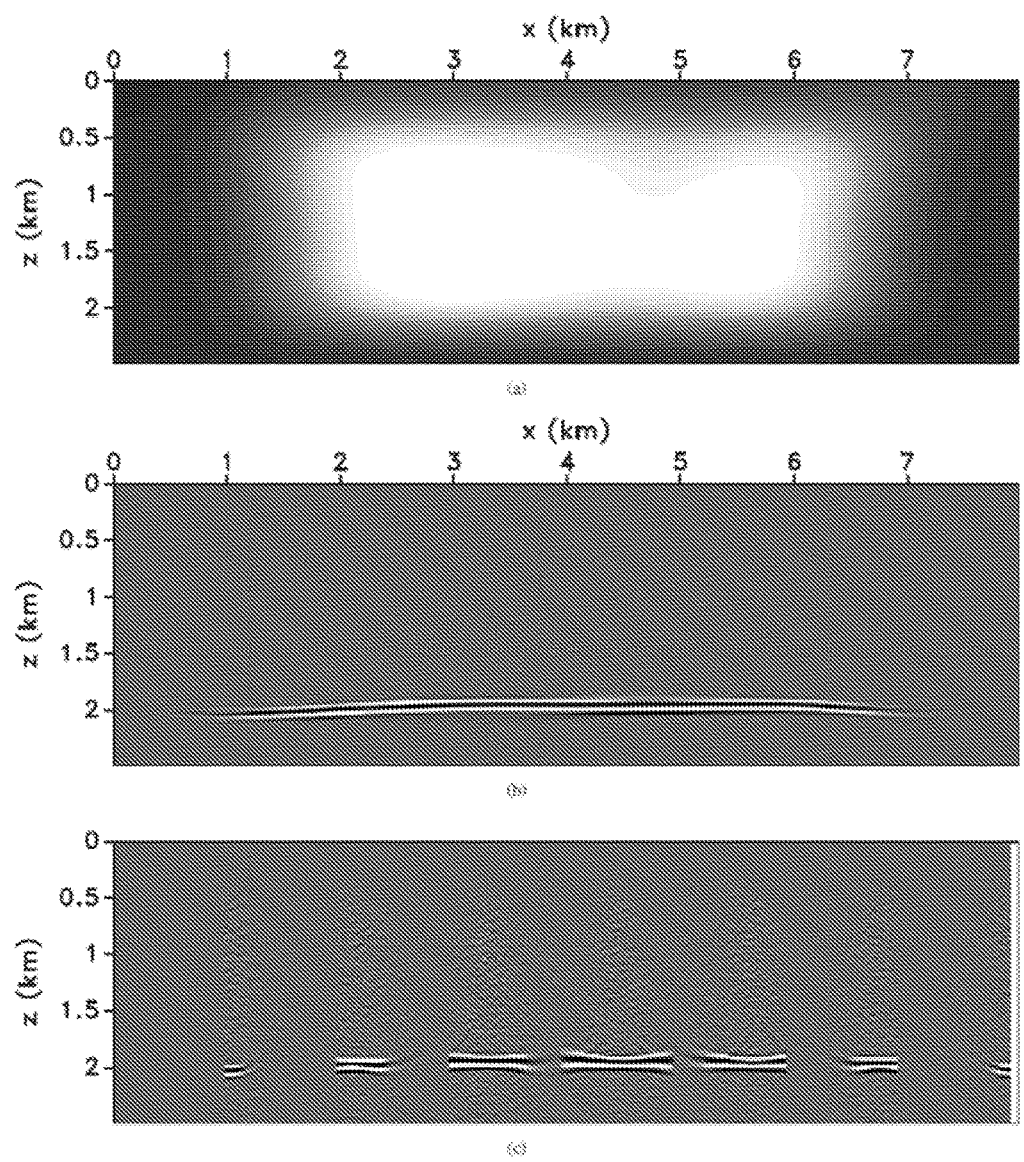

FIG. 12 illustrates the reconstructed slowness model (a), final migrated image (b), and shot-domain common-image gathers (c). The inversion involves 5 iterations of steepest descent. Observe the horizontal gathers that indicate the invariance of the image with respect to the shot position. The area of the model that is well illuminated is smaller than the actual extent of the perturbation and the inverted model has a higher value of slowness than the correct medium.

Figure 13:
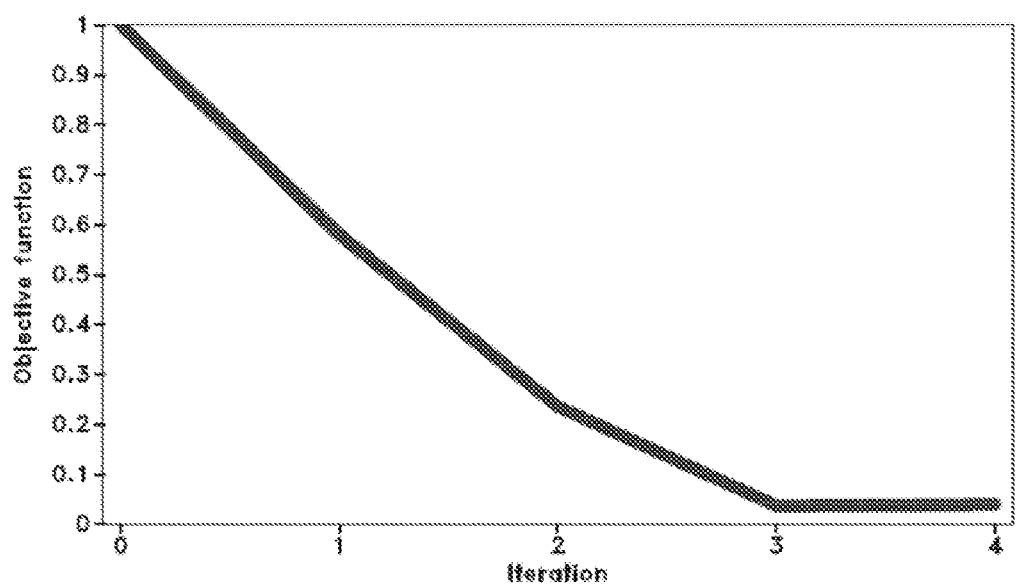

FIG. 13 shows that the objective function decreases as a function of iteration and flattens out when the common-image gathers are horizontal.

Figure 14:
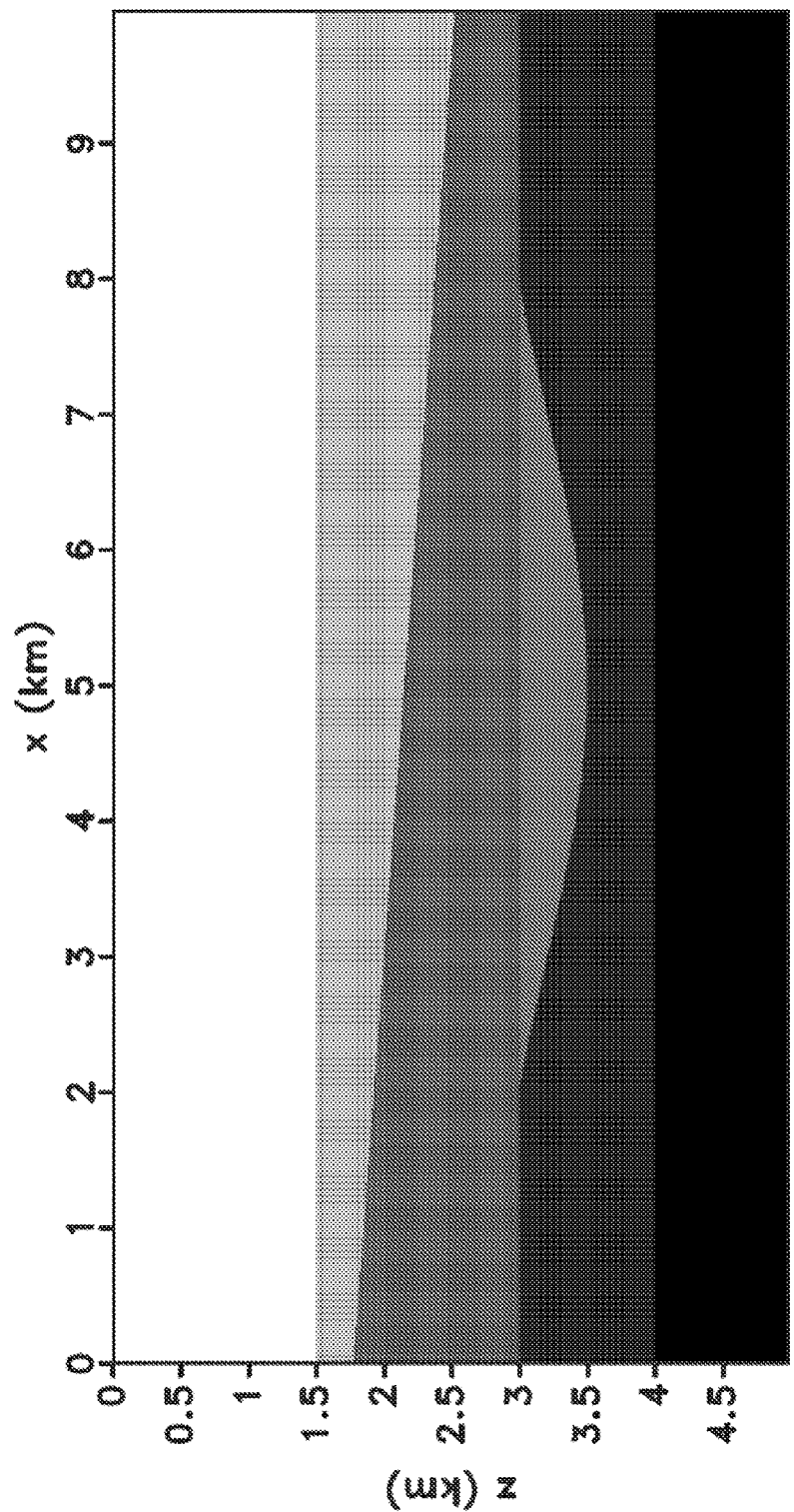

FIG. 14 shows the slowness model used to generate the full-acoustic data. Absorbing boundary conditions have been applied at all sides of the model. The lighter shades of grey indicate faster layers. The top layer has slowness of water (0.66 s/km).

Figure 15:
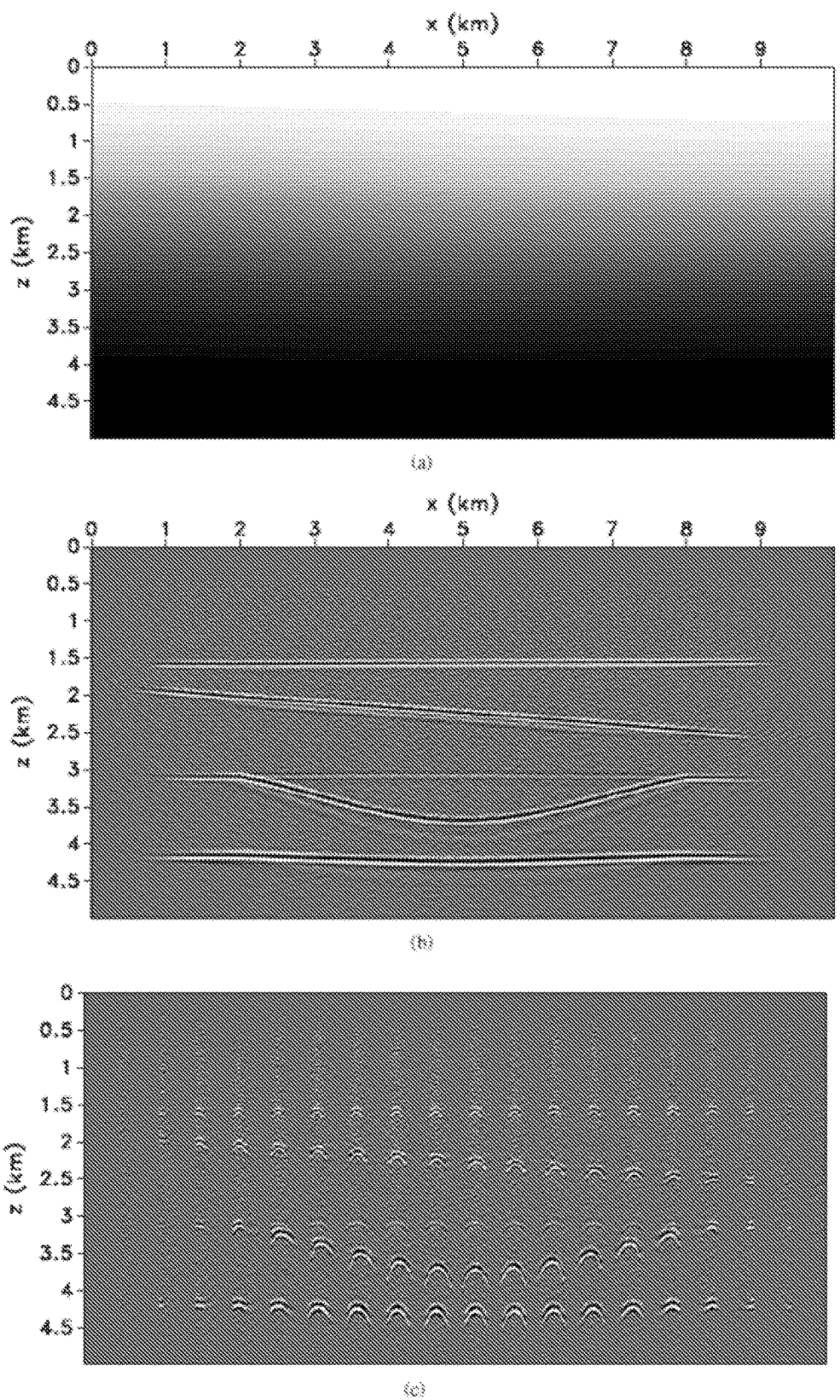
Figure 16:
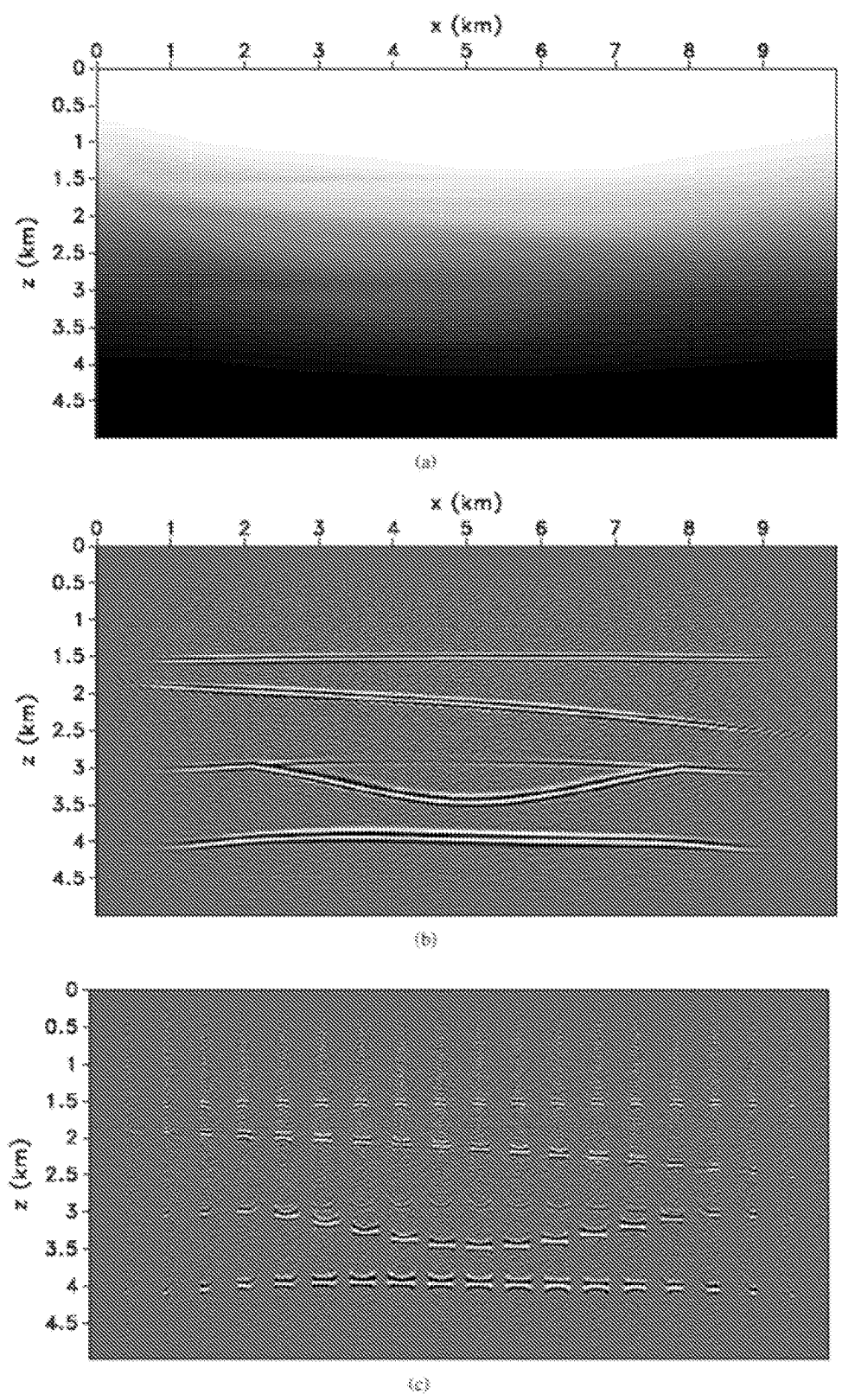

FIG. 15 shows the initial slowness model (a), associated migrated image (b), and shot-domain common-image gathers (c). The reflectors are severely defocused and mispositioned. Observe the curvature of the common-image gathers that shows how different experiments FIG. 16 shows the slowness model after 15 iterations of waveform inversion (a), migrated image (b), and shot-domain common-image gathers (c). Observe the improved focusing and positioning of the reflectors. The common-image gathers show that the images are invariant in the shot direction and the model is thus kinematically correct. Observe the profile of the various layers in the reconstructed model.

Figure 17:
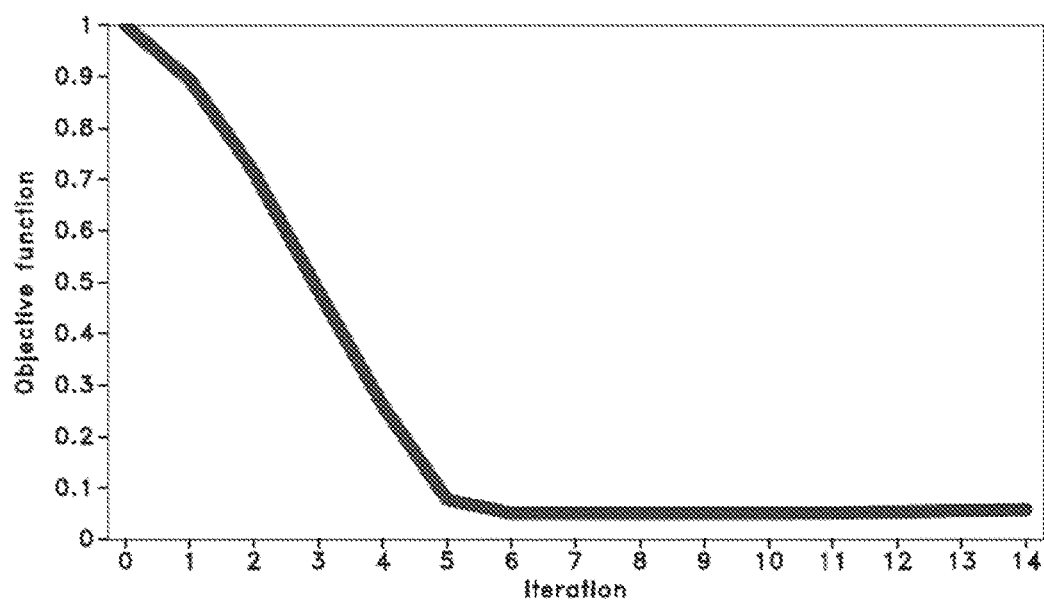

FIG. 17 shows the evolution of the objective function with iterations. Observe the sharp decrease of the objective function and the rapid convergence to a kinematically accurate model.

Figure 18:
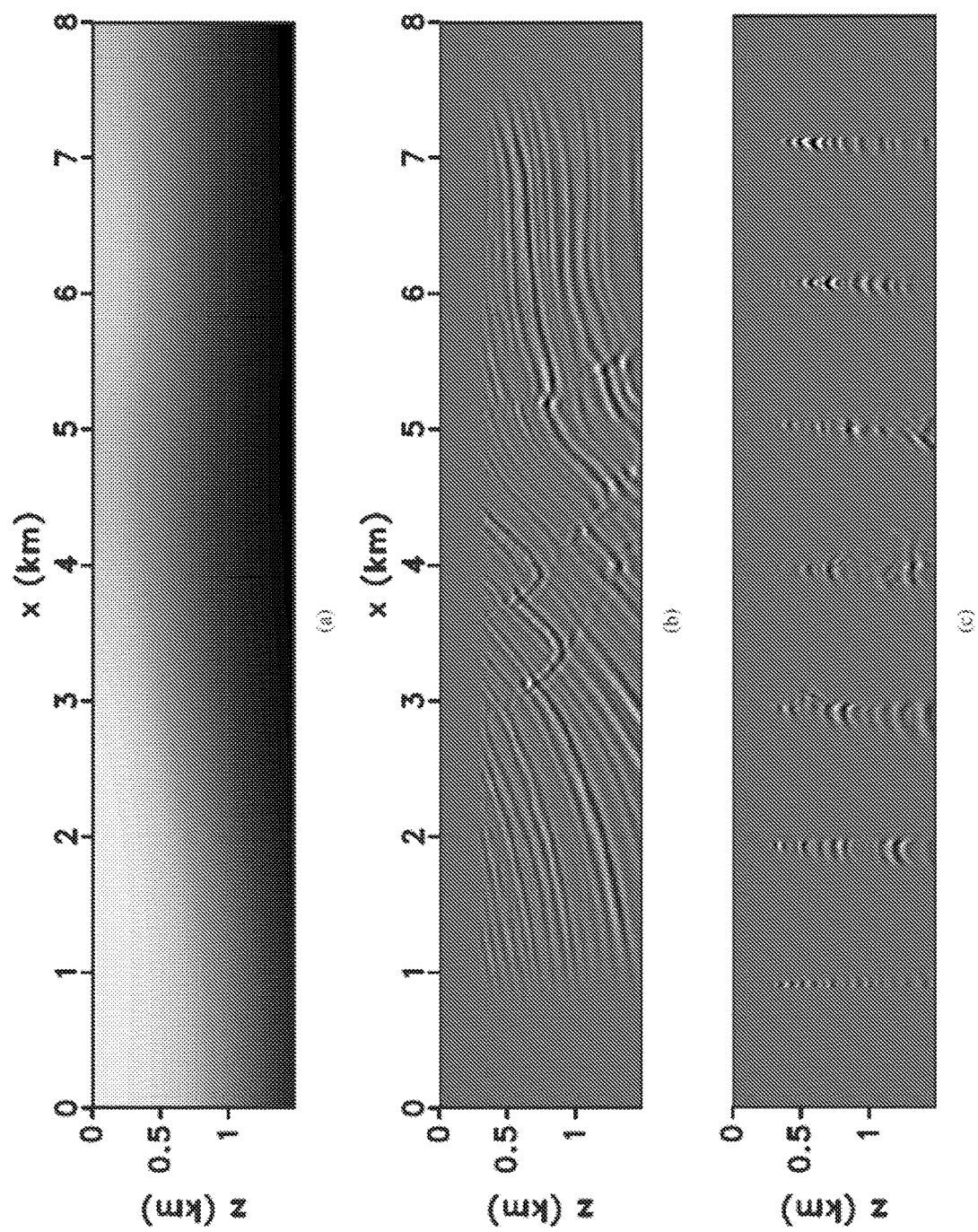

FIG. 18 shows the initial slowness model (a), initial migrated images (b), and shot-domain common-image gathers (c). The initial model is obtained by heavily smoothing and scaling by 0:9 the correct model.

Figure 19:
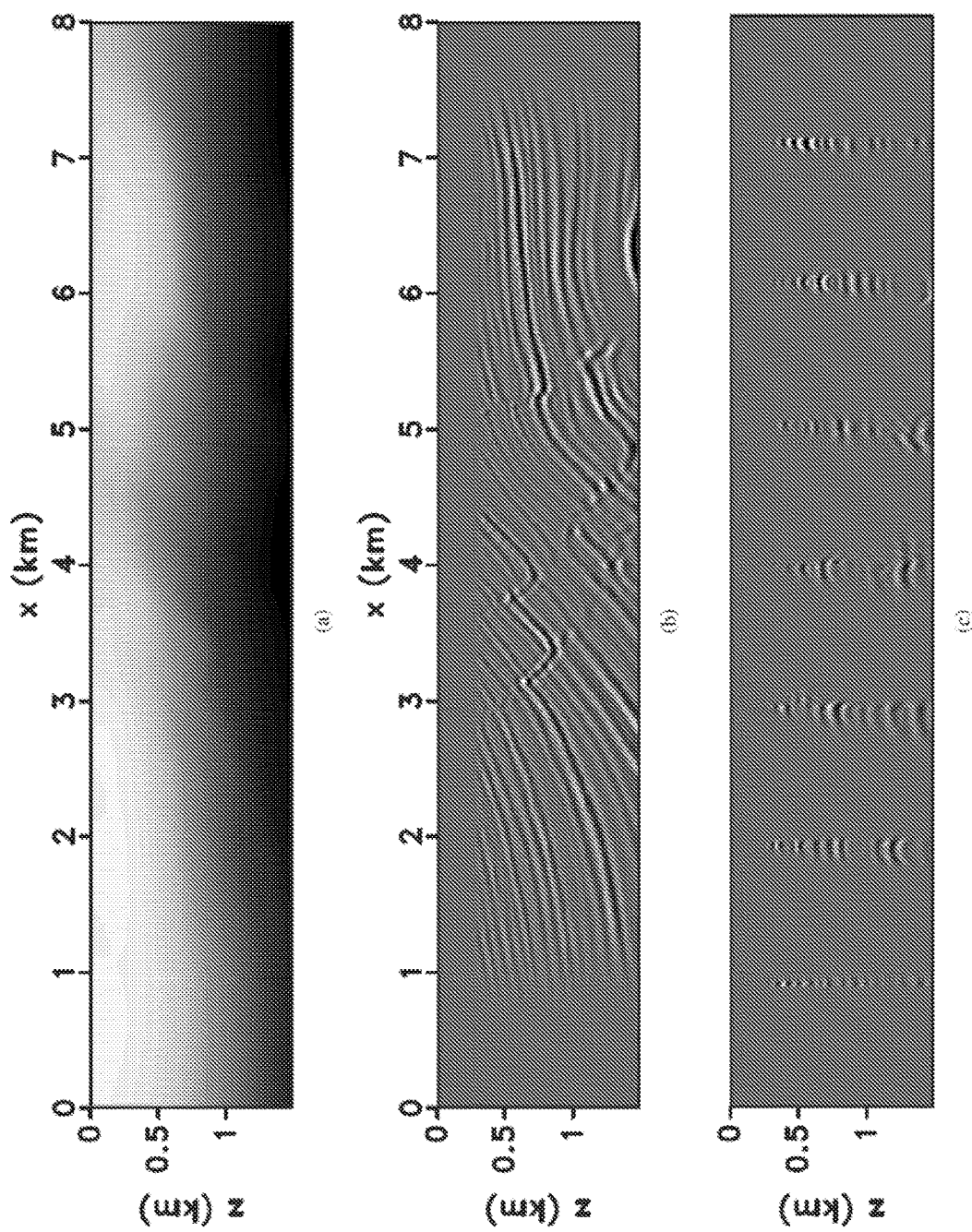

FIG. 19 shows the updated model (a), migrated image (b), and shot-domain common-image gathers (c) after 14 iterations of steepest descent.

Figure 20:
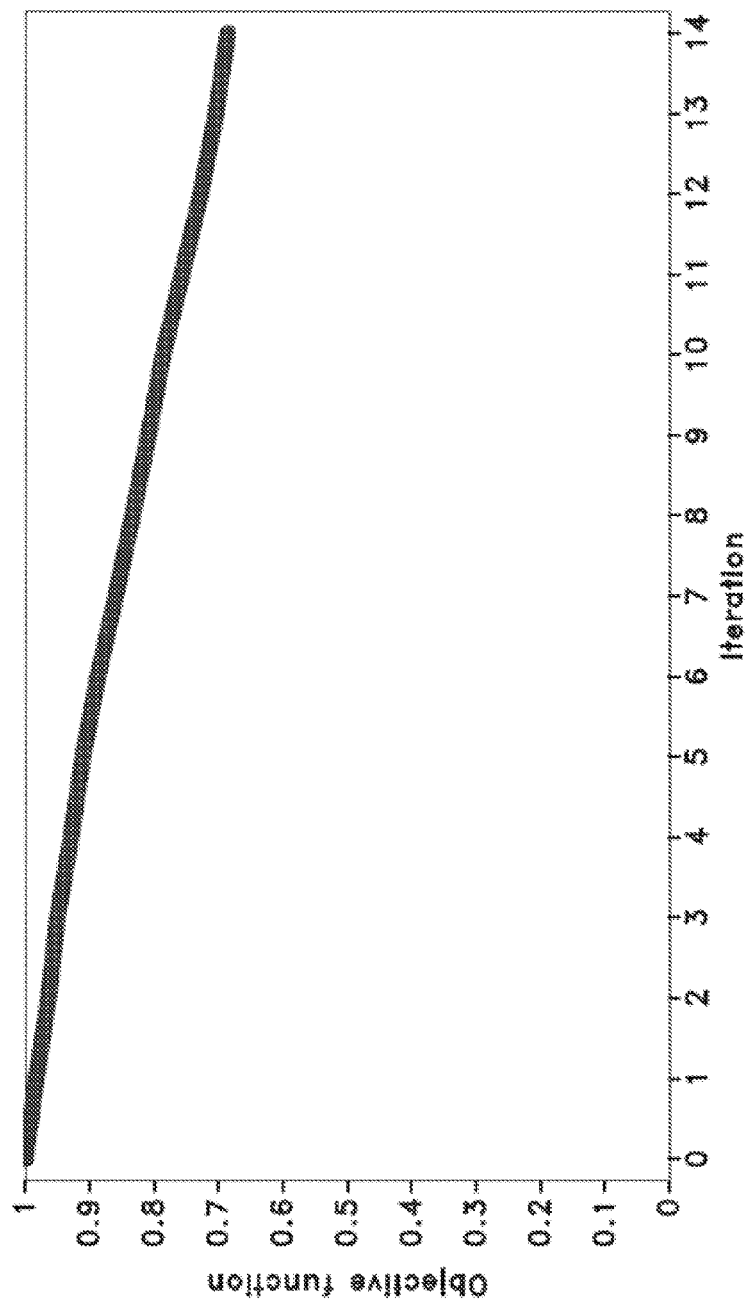

FIG. 20 shows the evolution of the objective function versus the number of iterations.

Figure 21:
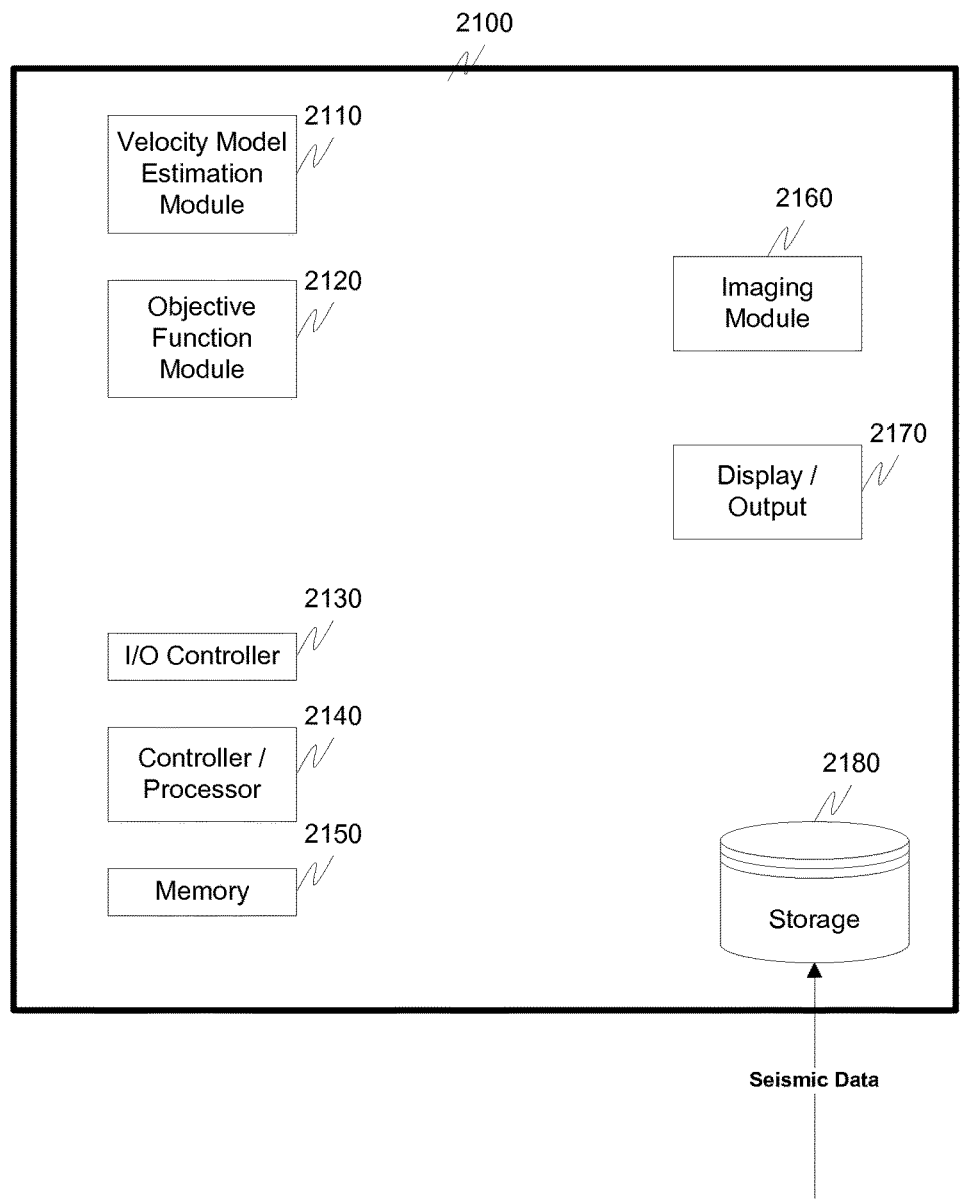

FIG. 21 illustrates an exemplary wavefield tomography system according to an exemplary embodiment of this invention.

Figure 22:
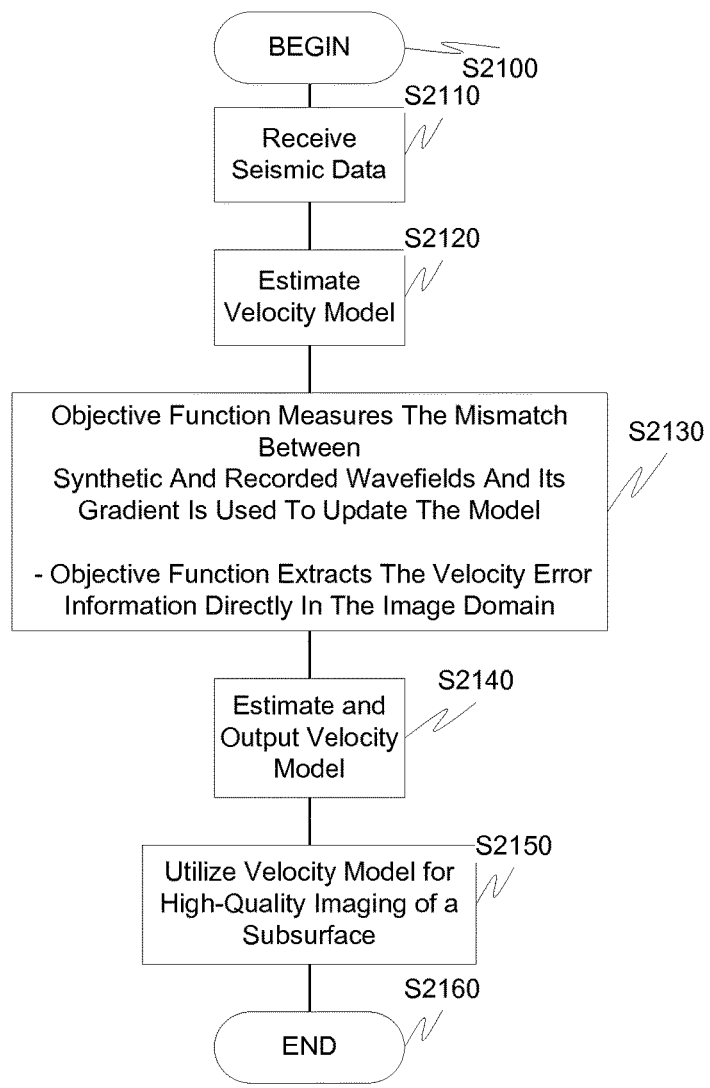

FIG. 22 is a flowchart illustrating an exemplary estimation of a velocity model according to an exemplary embodiment of this invention.

DETAILED DESCRIPTION

The exemplary embodiments of this invention will be described in relation to processing and interpretation of data, and in particular seismic data. The exemplary systems and methods of this invention will also be described in relation to seismic data interpretation and manipulation. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. However, it should be appreciated that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices or collocated on a particular node of a distributed network, such as a communications network. As will be appreciated from the following description, and for reasons of computational efficiency, the components of the system can be arranged at any location within a distributed network without affecting the operation of the system.

Furthermore, it should be appreciated that various links can be used to connect the elements and can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique, including those performed by a system, such as a processor, an expert system or neural network.

Additionally, all references identified herein are incorporated herein by reference in their entirely.

As discussed, an exemplary embodiment is directed toward the development of an objective function for migration velocity analysis in the shot-image domain. The exemplary technique is based on local image correlations and a reformulation of the semblance principle involving only small groups of migrated images. The optimization criterion is the minimization of the apparent shift between the migrated images and naturally leads to a differential semblance optimization problem, which is iteratively solved using a gradient-based method. The linearity of the operators in the objective function makes the computation of the gradient practical using the adjoint-state method. The exemplary approach is full-wave because it does not rely on the linearization of the wave extrapolation procedure with respect to the model parameters to construct a migration velocity analysis operator. The system iteratively solves a nonlinear problem with a gradient-based algorithm and the simulation of the wavefields is fully nonlinear with respect to the model parameters. A shown the method is tested using a few synthetic examples of increasing complexity.

FIG. 21 illustrates an exemplary wavefield tomography system 2100. In addition to well-known componentry, the system 2100 comprises a velocity model estimation module 2110, an objective function module 2120, an I/O controller 2130, a controller/processor 2140, memory 2150, imaging module 2160, display/output 2170 and storage 2180. The system 2100 can optionally be connected via one or more wired or wireless links to one or more networks or other wavefield tomography systems.

In operation, seismic data is received from one or more sources and stored in storage 2180. Next, and in cooperation with the velocity model estimation module 2110 and the objective function module 2120 (cooperating with processor 2140 and memory 2150) the velocity model is estimated by utilizing an objective function that measures a mismatch between synthetic and recorded wavefields. The gradient is then used to update the velocity model which can then be used by the imaging module 2160 and the display/output 2170 to output interpreted images.

More specifically, The structural features in the migrated image and the variation of these features as function of experiment supply valuable information about the model parameters. Here, it is shown that it is possible, without constructing common-image gathers, to extract information about the model from a very limited number of experiments using a warping relationship between migrated images. Despite the fact that the system may neglect the variation of the image dip field with respect to the model parameters, the system is nevertheless able to correct anomalies in the model.

Computation of the source and receiver adjoint source

The objective function is defined as $$\Im(m) = \frac{1}{2}\sum_i \|r_i(x)\|_x^2 = \frac{1}{2}\sum_i \left\|\int P(x,\lambda)c_i(x,\lambda)d\lambda\right\|_x^2, \quad (A-1)$$

where:

$$c_i(x,\lambda) = \int_{w(x)} R_{i+1}\left(\xi - \frac{\lambda}{2}\right)R_i\left(\xi + \frac{\lambda}{2}\right)d\xi$$

is the local correlation of two images from the nearby shots i and (i+1), and $P(x, \lambda)$ is an operator that annihilates the local correlation panel along the direction of the structure at every point in the image.

The adjoint-state method computes the gradient of the objective function with respect to the model parameters by solving two forward problems for each state variable of the system. This procedure turns out to be extremely computationally efficient since it avoids perturbing each model parameter and computing the resulting state variable perturbation (Lions, 1972; Plessix, 2006). The solution of the auxiliary forward problem requires different sources (adjoint sources) that are computed by differentiating the objective function with respect to the state variables.

The mathematical expression for the source and receiver adjoint sources is now derived. The computation of the derivative of a functional with respect to a function requires the definition of an inner product in the appropriate functional space; moreover, it requires the concept of the Fréchet differential (Vogel, 2002).

Let us denote the state variables of the problem, i.e., the source and receiver wavefields for the ith shot, by $u_{s,i}$ and $u_{r,i}$, respectively. We derive the expression of the adjoint source for the source wavefield. The derivation and expression of the adjoint source for the receiver wavefield are analogous. First, we make explicit the dependency of the residual $r_i(x)$ (and thus of the objective function $\Im$) on the state variable:

$$r_i(x) = \int P(x,\lambda)w(x-\xi)u_{s,i}\left(\xi - \frac{\lambda}{2}, t\right) \bullet u_{r,i}\left(\xi - \frac{\lambda}{2}, t\right)R_{i+1}\left(\xi + \frac{\lambda}{2}\right)dV, \quad (A-2)$$

where the integral is a triple integral over the volume element $dV = dt\,d\xi\,d\lambda$.

Second, we compute the Fréchet differential of the objective function $-\Im(m)$ with respect to an arbitrary perturbation of the state variable $\delta u_{s,i}$. The objective function in equation A-1 is the sum over shots of energy of the residues in equation A-2 over the spatial domain. In order to simplify the derivation, we first write the differential of the objective function as a function of the differential of the residual using perturbation theory:

$$\Im[u_{s,i}] + \delta\Im[u_{s,i}, \delta u_{s,i}] = \frac{1}{2}\int(r_{i-1} + \delta r_{i-1}[u_{s,i}, \delta u_{s,i}])^2 \nabla u_{s,i} + (r_i + \delta r_i[u_{s,i}, \delta u_{s,i}])^2 dx \quad (A-3)$$

Expanding the squares in equation A-3 and considering only the terms that are linear in the wavefield perturbation, we obtain an expression for the Fréchet differential of the objective function:

$$\delta\Im[u_{s,i}, \delta u_{s,i}] = \int r_{i-1}\delta r_{i-1}[u_{s,i}, \delta u_{s,i}] + r_i\delta r_i[u_{s,i}, \delta u_{s,i}]dx. \quad (A-4)$$

The square brackets in equation A-4 indicate the double dependency of the Fréchet differential on the state variable and its arbitrary perturbation.

Assuming $r_i(x)$ is Fréchet differentiable, we compute the Fréchet differential using the limit of the incremental ratio:

$$\delta r_i[u_{s,i}, \delta u_{s,i}] = \lim_{h\to 0}\frac{r_i[u_{s,i} + h\delta u_{s,i}] - r_i[u_{s,i}]}{h}, \quad (A-5)$$

where h is a scalar, and $\delta u_{s,i}$ is an arbitrary perturbation of the state variable $u_{s,i}$ and belongs to the same functional space. The residual $r_i$ is a linear functional of $u_{s,i}$, and computing the limit in equation A-5 we obtain $$\delta r_i = \int P(x,\lambda) w(x-\xi) \delta u_{s,i}\left(\xi - \frac{\lambda}{2}, t\right) \cdot u_{r,i}\left(\xi - \frac{\lambda}{2}, t\right) R_{i+1}\left(\xi + \frac{\lambda}{2}\right) dV. \quad \text{(A-6)}$$

We want to express equation A-6 as an inner product between an operator (the Fréchet derivative) and the state variable perturbation $\delta u_{s,i}$; we perform a change of variables to make the perturbation of the state variable $\delta u_{s,i}$ depend only on a single independent variable. We define two new variables $$\eta = \xi - \frac{\lambda}{2}$$

and $\chi = \lambda$; the Jacobian of this transformation is trivial and equal to 1; then, in the new coordinate system, we have $$\delta r_i = \int P(x,\chi) w\left(x - \eta - \frac{\chi}{2}\right) \delta u_{s,i}(\eta, t) \cdot u_{r,i}(\eta, y) R_j(\eta + \chi) dV', \quad \text{(A-7)}$$

where the triple integral is over the new volume element $dV' = dt d\eta d\chi$. From equation A-7, we find the expression of the gradient of the residual $r_i$ with respect to the state variable $u_{s,i}$:

$$\nabla_{u_{s,i}} r_i = \int P(x,\chi) w\left(x - \eta - \frac{\chi}{2}\right) u_{r,i}(\eta, t) \cdot R_{i+1}(\eta + \chi) d\chi. \quad \text{(A-8)}$$

Combining equation A-8 into A-4, we can finally write the equation for the gradient of the objective function $\Im$ with respect to the state variable $u_{s,i}$ as $$\nabla_{u_{s,i}} \Im = u_{r,i}(\eta, t)[r_{i-1} P(x,\lambda) * R_{i-1}(x) + r_i P(x,\lambda) \star R_{i+1}(x)], \quad \text{(A-9)}$$

where $$P(x,\lambda) * R_{i-1}(x) = \int w\left(x - \eta + \frac{\chi}{2}\right) \cdot P(x,\chi) R_{i-1}(\eta - \chi) d\chi$$

and $$P(x,\lambda) \star R_{i-1}(x) = \int w\left(x - \eta + \frac{\chi}{2}\right) \cdot P(x,\chi) R_{i-1}(\eta - \chi) d\chi$$

are the local convolution and local correlation of the penalty operator with the image over the local window w, respectively. The derivation for the receiver-side adjoint source is totally analogous and leads to the formula $$\nabla_{i_{r,i}} \Im = u_{s,i}(\eta, t)[r_{i-1} P(x,\lambda) * R_{i-1}(x) + r_i P(x,\lambda) * R_{i+1}(x)]. \quad \text{(A-10)}$$

Equations A-9 and A-10 are the expressions for the adjoint sources in equations 10 and 11.

FIG. 22 illustrates an exemplary method for wavefield tomography according to an exemplary embodiment. Specifically, control begins in step S2200 and continues to step S2210. In step S2110, seismic data is received. Next, in step S2120, the velocity model is estimated, that can later be used for high-quality imaging of a subsurface, where velocity estimation is formulated as an objective function in step S2130 where the objective function measures a mismatch between synthetic and recorded wavefields. The determined gradient is then used to update the velocity estimation model. Then, in steps S2140 and S2150, the updated velocity model is saved and can be used for subsurface imaging. Control then continues to step S2160 where the control sequence ends.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

The systems, methods and techniques of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any means, or the like. In general, any device capable of implementing a state machine that is in turn capable of implementing the methodology illustrated herein can be used to implement the various methods and techniques according to this invention.

Furthermore, the disclosed methods may be readily implemented in processor executable software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems, methods and techniques illustrated herein can be readily implemented in hardware and/or software using any known or later developed systems or structures, devices and/or software by those of ordinary skill in the applicable art from the functional description provided herein and with a general basic knowledge of the computer and geologic arts.

Moreover, the disclosed methods may be readily implemented in software that can be stored on a non-transitory computer-readable storage medium, executed on programmed general-purpose computer with the cooperation of a controller and memory, a special purpose computer, a microprocessor, or the like. The systems and methods of this invention can be implemented as program embedded on personal computer such as an applet, JAVA® or CGI script, in C or C++, Fortran, or the like, as a resource residing on a server or computer workstation, as a routine embedded in a dedicated system or system component, or the like. The system can also be implemented by physically incorporating the system and/or method into a software and/or hardware system, such as the hardware and software systems of a dedicated seismic interpretation device.

It is therefore apparent that there has been provided, in accordance with the present invention, systems and methods for interpreting data. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

REFERENCES

One of ordinary skill in the art would be aware of the following references which are incorporated herein by reference in their entirety:

Al-Yahya, K., 1989, Velocity analysis by iterative profile migration: Geophysics, 54, P. 718-729.

Albertin, U., P. Sava, J. Etgen, and M. Maharramov, 2006, Adjoint wave-equation velocity analysis: Presented at the 74th Ann. Internat. Mtg., SEG.

Baysal, E., D. D. Kosloff, and J. W. C. Sherwood, 1983, Reverse time migration: Geophysics, 48, 1514-1524.

Biondi, B., and P. Sava, 1999, Wave-equation migration velocity analysis: Presented at the 69th Ann. Internat. Mtg., SEG.

Biondi, B., and W. W. Symes, 2004, Angle-domain commonimage gathers for migration velocity analysis by wavefield continuation imaging: Geophysics, 69, 1283-1298.

Bishop, T. N., K. P. Bube, R. T. Cutler, R. T. Langan, P. L. Love, J. R. Resnick, R. T. Shuey, D. A. Spindler, and H. W. Wyld, 1985, Tomographic determination of velocity and depth in laterally varying media: Geophysics, 50, 903-923.

Carcione, J., 2007, Wave fields in real media wave propagation in anisotropic, anelastic, porous and electromagnetic media: Elsevier. Handbook of Geophysical Exploration.

Chang, W., P. Carrion, and G. Beylkin, 1987, Wavefront sets of solutions to linearised inverse scattering problems: Inverse Problems, 3, 683-690.

Chavent, G., and C. A. Jacewitz, 1995, Determination of background velocities by multiple migration fitting: Geophysics, 60, 476-490.

Claerbout, J. F., 1985, Imaging the earth's interior: Blackwell Publishing. Claerbout, J. F., and F. Muir, 1973, Robust modeling with erratic data: Geophysics, 38, 826-844.

de Vries, D., and A. J. Berkhout, 1984, Velocity analysis based on minimum entropy: Geophysics, 49, 2132-2142.

Farmer, P. A., I. F. Jones, H. Zhou, R. I. Bloor, and M. C. Goodwin, 2006, Application of reverse time migration to complex imaging problems: First Break, 24, 65-73.

Faye, J.-P., and J.-P. Jeannot, 1986, Prestack migration velocity analysis from focusing depth imaging: Presented at the 56th Ann. Internat. Mtg., Soc. of Expl. Geophys.

Fomel, S., 2002, Applications of plane-wave destruction filters: Geophysics, 67, 1946-1960.

Fowler, P., 1985, Migration velocity analysis by optimization: Technical Report 44, Stanford Exploration Project.

Gazdag, J., and P. Sguazzero, 1984, Migration of seismic data by phase shift plus interpolation: Geophysics, 49.

Hale, D., 2006, An efficient method for computing local cross-correlations of multi-dimensional signals: Technical Report CWP-544, Center for Wave Phenomena, Colorado School of Mines.

Hale, D., 2007a, Local dip filtering with directional laplacian: Technical Report CWP-567, Center for Wave Phenomena, Colorado School of Mines.

Hale. D 2007b, A method for estimating apparent displacement vectors from time-lapse seismic data: Technical Report CWP-566, Center for Wave Phenomena, Colorado School of Mines.

Kelly, S., J. R. Martinez, B. tsimelzon, and S. Crawley, 2010, A comparison of inversion results for two full-waveform methods that utilize the lowest frequencies in dual-sensor recordings: Presented at the 80th Ann. Internat. Mtg., Soc. of Expl. Geophys.

Lambar'e, G., M. Alerini, R. Baina, and P. Podvin, 2004, Stereotomography: a semi-automatic approach for velocity macromodel estimation: Geophysical Prospecting, 52, 671-681.

Lions, J., 1972, Nonhomogeneous boundary value problems and applications: Springer Verlag, Berlin.

Liu, F., D. W. Hanson, N. D. Whitmore, R. S. Day, and R. H. Stolt, 2006, Toward a unified analysis for source plane wave migration: Geophysics, 71, S129-S139.

Ma, Y., D. Hale, Z. Meng, and B. Gong, 2010, Full waveform inversion with image-guided gradient: Presented at the $80^{th}$ Ann. Internat. Mtg., Soc. of Expl. Geophys.

McMechan, G. A., 1983, Migration by extrapolation of timedependent boundary values: Geophysical Prospecting, 31, 413-420.

Morton, S. A., and C. C. Ober, 1998, Faster shot-record migration using phase encoding: Presented at the 68th Ann. Internat. Mtg., SEG.

Mulder, W. A., and A. P. E. Kroode, 2002, Automatic velocity analysis by differential semblance optimization: Geophysics, 67, 1184-1191.

Perrone, F., and P. Sava, 2011, Wave-equation migration with dithered plane waves: Geophysical Prospecting.

Perrone, F., P. Sava, C. Andreoletti, and N. Bienati, 2012, Wave-equation migration velocity analysis by image warping: Technical Report CWP-708, Center for Wave Phenomena, Colorado School of Mines.

Plessix, R.-E., 2006, A review of the adjoint-state method for computing the gradient of a functional with geophysical applications: Geophys. J. Int., 167, 495-503.

Pratt, R. G., 1999, Seismic waveform inversion in the frequency domain, part 1: Theory and verification in a physical scale model: Geophysics, 64, 888-901.

Rickett, J., and P. Sava, 2002, Offset and angle-domain common image-point gathers for shot-profile migration: Geophysics, 67, 883-889.

Romero, L. A., D. C. Ghiglia, C. C. Ober, and S. A. Morton, 2000, Phase encoding of shot records in prestack migration: Geophysics, 65, 426-436.

Santosa, F., and W. W. Symes, 1989, An analysis of least-squares velocity inversion, in Geophysical Monograph no. 4: Soc. of Expl. Geophys.

Sava, P., and B. Biondi, 2004, Wave-equation migration velocity analysis. i. theory: Geophysical Prospecting, 52, 593-606.

Sava, P., B. Biondi, and J. Etgen, 2005, Wave-equation migration velocity analysis by focusing diffractions and reflections:Geophysics, 70, U19-U27.

Sava, P., and S. Fomel, 2003, Angle-domain common-image gathers by wavefield continuation methods: Geophysics, 68, 1065-1074.

Sava, P., and I. Vasconcelos, 2009, Extended commonimage-point gathers for wave-equation migration: Presented at the 71th Ann. Internat. Mtg., European Association of Geoscientists and Engineers.

Shen, P., and W. W. Symes, 2008, Automatic velocity analysis via shot profile migration: Geophysics, 73, VE49VE59.

Sirgue, L., O. I. Barkved, J. Dellinger, J. Etgen, U. Albertin, and J. H. Kommedal, 2010, Full waveform inversion: the next leap forward in imaging at valhall: First Break, 28, 65-70.

Sirgue, L., and R. Pratt, 2004, Efficient waveform inversion and imaging: A strategy for selecting temporal frequencies: Geophysics, 69, 231-248.
Soubaras, R., 2006, Modulated-shot migration: 76th Ann. Internat. Mtg., Soc. of Expl. Geophys., 2430-2433.
Stoffa, P. L., J. T. Fokkema, R. M. de Luna Freire, and W. P. Kessiger, 1990, Split-step fourier migration: Geophysics, 55.
Stoffa, P. L., M. K. Sen, R. K. Seifoullaev, R. C. Pestana, and J. T. Fokkema, 2006, Plane-wave depth migration: Geophysics, 71, S261-S272.
Stolt, R. H., 1978, Migration by fourier transform: Geophysics, 43.
Symes, W. W., 1991, Layered velocity inversion: A model problem from reflection seismology problem from reflection seismology: SIAM J. on Math. Analysis, 22, pp. 680-716. Symes, W. W., 2008, Migration velocity analysis and waveform inversion: Geophysical Prospecting, 56, 765-790.
Symes, W. W., and J. J. Carazzone, 1991, Velocity inversion by differential semblance optimization: Geophysics, 56, 654-663.
Taner, M. T., and F. Koehler, 1969, Velocity spectra—digital computer derivation and applications of velocity functions: Geophysics, 34, 859-881.
Tarantola, A., 1984, Inversion of seismic reflection data in the acoustic approximation: Geophysics, 49, 71-92. Tarantda, A., 2005, Inverse problem theory and methods for model parameter estimation: SIAM.
van Leeuwen, T., and W. A. Mulder, 2008, Velocity analysis based on data correlation: Geophysical Prospecting, 56, 791-803.
van Vliet, L. J., and P. W. Verbeek, 1995, Estimators for orientation and anisotropy in digitalized images: Proceedings of the first annual conference of the Advanced School for
Computing and Imaging, ASCI'95, 442-450.
Vogel, C., 2002, Computational methods for inverse problems: SIAM.
Whitmore, N., 1995, An imaging hierarchy for commonangle plane wave seismograms: PhD thesis, University of Tulsa.
Woodward, M. J., 1992, Wave-equation tomography: Geophysics, 57, 15-26.
Xie, X. B., and H. Yang, 2008, The finite-frequency sensitivity kernel for migration residual moveout and its applications in migration velocity analysis: Geophysics, 73, S241-S249.
Yang, T., and P. Sava, 2010, Wave-equation migration velocity analysis with extended common-image-point gathers: Presented at the 80th Ann. Intenat. Mtg., Soc. of Expl. Geophys.
Yan, T., and Sava, P., 2011, Wave-equation migration velocity analysis with time-shift imaging: Geophysical Prospecting, 59, 635-650.
Yilmaz, O., and R. Chambers, 1984, Migration velocity analysis by wave-field extrapolation: Geophysics, 49, P. 1664-1674.
Zhang, Y., J. Sun, C. Notfors, S. H. Gray, L. Chernis, and J. Young, 2005, Delayed-shot 3d depth migration: Geophysics, 70, E21-E28.

The invention claimed is:

1. A method of analyzing seismic image data, comprising:
receiving a first image, the first image representing image data of a geological structure obtained from seismic receivers in a first position relative to the geological structure;
receiving a second image, the second image representing image data of the geological structure obtained from seismic receivers in a second position relative to the geological structure, wherein the first position and the second position are in different physical locations with respect to the geological structure;
measuring relative shift of the second image as compared to the first image with respect to the geological structure, wherein measuring relative shift of the second image as compared to the first image comprises performing a direct image domain comparison of the first image with the second image through a local image space correlation without computing common-image gathers; and
based on the direct image domain comparison, estimating a velocity model of the geological structure.

2. The method of claim 1, wherein a structural element of the geological structure comprises a structural dip.

3. The method of claim 1, wherein measuring relative shift comprises:
directly comparing, using a computer, the first image with the second image; and
measuring inconsistencies between the first and second images as phase shifts in the image space.

4. The method of claim 3, wherein measuring relative shift further comprises building a model, from the first and second images, wherein the model can be evaluated using an objective function.

5. The method of claim 4, wherein the objective function is utilized to measure a mismatch between synthetic wavefields and the first and second images.

6. The method of claim 4, wherein the objective function evaluates a focus of the model.

7. The method of claim 4, wherein the objective function evaluates a degree of semblance between the first and second images.

8. A method of analyzing seismic image data comprising:
obtaining a first image data set of data from a first seismic experiment associated with a geological structure;
making a first image from the first image data set;
obtaining a second image data set of data from a second seismic experiment associated with the geological structure, wherein the first seismic experiment is taken in a different physical location as the second seismic experiment relative to the geological structure;
making a second image from the second image data set;
measuring, by a computer, relative shift of the second image data set as compared to the first image data set with respect to the geological structure, wherein measuring relative shift of the second image data set as compared to the first image data set comprises performing a direct image domain comparison of the first image with the second image through a local image space correlation without computing common-image gathers; and
based on the similarity between the first and second image, defining an objective function which minimizes as the similarity between the first and second image increases.

9. The method of claim 8, further comprising designing a tomographic procedure to determine a minimum of the objective function.

10. The method of claim 8, wherein the first and second seismic experiments illuminate the same geologic structure.

11. A system that analyzes seismic image data, comprising: a storage device that receives a first image data set, the first image data set representing image data obtained from seismic receivers in a first position relative to a geological structure and receives a second image data set, the second image data set representing image data obtained from seismic receivers in a second position relative to the geological structure; and a velocity model estimation module that causes a processor to estimate a velocity model of the geological structure by measuring relative shift of the second image data as compared to the first image data with respect to a structural element of the geological structure by performing a direct image domain comparison of the first image data set with the second image data set through a local image space correlation without computing common-image gathers.

12. The system of claim 11, wherein the structural element comprises a structural dip.

13. The system of claim 11, wherein the processor further compares the first image data set with the second image data set and measures inconsistencies between the first and second image data sets as phase shifts in the image space.

14. The system of claim 13, further comprising an objective function module that causes the processor to construct a model, from the first and second image data sets, wherein the model can be evaluated using an objective function.

15. The system of claim 14, wherein the objective function is utilized to measure a mismatch between synthetic wavefields and the first and second image data sets.

16. The system of claim 14, wherein the objective function evaluates a focus of the model.

17. The system of claim 14, wherein the objective function evaluates a degree of semblance between the first and second image data sets.

18. A non-transitory computer-readable information storage media having stored thereon instructions, that when executed by one or more computers, performs the steps in claim 1.

19. A method to estimate a velocity model from seismic data comprising:

estimating a velocity model of the geological structure utilizing an objective function that measures, using a microprocessor, a mismatch between synthetic wavefields and the first and second image data sets in the seismic data by performing a direct image domain comparison of the first image data set with the second image data set through a local image space correlation without computing common-image gathers; and storing an updated velocity model based on a gradient.

20. The method of claim 19, wherein velocity information is extracted directly in an image domain.

* * * * *